(12) United States Patent
Fujino

(10) Patent No.: US 11,988,856 B2
(45) Date of Patent: May 21, 2024

(54) DISPLAY MEDIUM, AUTHENTICITY DETERMINATION METHOD, AND ARTICLE INCLUDING DISPLAY MEDIUM

(71) Applicant: ZEON CORPORATION, Tokyo (JP)

(72) Inventor: Yasuhide Fujino, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 269 days.

(21) Appl. No.: 17/596,908

(22) PCT Filed: Jun. 4, 2020

(86) PCT No.: PCT/JP2020/022170
§ 371 (c)(1),
(2) Date: Dec. 21, 2021

(87) PCT Pub. No.: WO2020/261923
PCT Pub. Date: Dec. 30, 2020

(65) Prior Publication Data
US 2022/0326422 A1 Oct. 13, 2022

(30) Foreign Application Priority Data

Jun. 26, 2019 (JP) ................................. 2019-119065

(51) Int. Cl.
*G02B 5/30* (2006.01)
*B42D 25/364* (2014.01)

(52) U.S. Cl.
CPC ......... *G02B 5/3016* (2013.01); *B42D 25/364* (2014.10)

(58) Field of Classification Search
CPC ...... G02B 5/3083; G02B 5/30; G02B 5/3016; G02B 5/305; G02B 5/3025; G02B 5/3041;
(Continued)

(56) References Cited

U.S. PATENT DOCUMENTS

| 6,061,122 A | 5/2000 | Hoshino et al. |
| 6,217,792 B1 | 4/2001 | Parri et al. |

(Continued)

FOREIGN PATENT DOCUMENTS

| EP | 1748306 A1 * | 1/2007 | ........... B42D 25/328 |
| EP | 3351980 A1 * | 7/2018 | ........... C09K 19/322 |

(Continued)

OTHER PUBLICATIONS

Dec. 28, 2021, International Preliminary Report on Patentability issued in the International Patent Application No. PCT/JP2020/022170.

(Continued)

*Primary Examiner* — Michael P Stafira
(74) *Attorney, Agent, or Firm* — KENJA IP LAW PC

(57) ABSTRACT

A display medium including a first layer, a second layer, and a third layer, wherein: a part or an entirety of the first layer, a part or an entirety of the second layer, and a part or an entirety of the third layer are stacked in a thickness direction in this order; the first layer is a layer that is capable of reflecting circularly polarized light having a rotation direction D1 and allowing to pass therethrough circularly polarized light having a rotation direction D2, which is a direction opposite to the rotation direction D1; the second layer is a phase difference layer; and the third layer is a layer that is capable of reflecting circularly polarized light whose rotation direction is the rotation direction D1 and allowing to pass therethrough circularly polarized light whose rotation direction is the rotation direction D2.

5 Claims, 4 Drawing Sheets

(58) Field of Classification Search
CPC ........ G02B 5/045; G02B 5/02; G02B 5/3033; G02B 6/0053; G02B 27/283; G02B 5/0231; G02B 1/14; G02B 27/286; G02B 5/04; G02B 5/0242; G02B 6/0056; G02B 1/04; G02B 27/34; G02B 5/0808; G02B 5/0278; G02B 5/0289; G02B 6/0016; G02B 27/281; G02B 30/25; G02B 5/00; G02B 5/0205; G02B 5/0294; G02B 5/3058; G02B 6/0003; B42D 25/364; B42D 25/36; B42D 25/391; B42D 25/351; B42D 25/373
See application file for complete search history.

(56) References Cited

U.S. PATENT DOCUMENTS

| | | |
|---|---|---|
| 6,468,444 B1 | 10/2002 | Meyer et al. |
| 2003/0137632 A1 | 7/2003 | Kawabata |
| 2004/0247825 A1 | 12/2004 | Faris et al. |
| 2007/0159671 A1 | 7/2007 | Hoshino et al. |
| 2008/0129036 A1 | 6/2008 | Seki et al. |
| 2008/0282322 A1 | 11/2008 | Saito |
| 2010/0134724 A1 | 6/2010 | Arakawa et al. |

FOREIGN PATENT DOCUMENTS

| | | | | |
|---|---|---|---|---|
| JP | H0672962 A | 3/1994 | | |
| JP | 2000255200 A | 9/2000 | | |
| JP | 2000290315 A | 10/2000 | | |
| JP | 2003066214 A | 3/2003 | | |
| JP | 2003313187 A | 11/2003 | | |
| JP | 2003342219 A | 12/2003 | | |
| JP | 2004115414 A | 4/2004 | | |
| JP | 2004341417 A | * 12/2004 | ........... G02B 27/288 |
| JP | 3652476 B2 | 5/2005 | | |
| JP | 2005289881 A | 10/2005 | | |
| JP | 2007176870 A | 7/2007 | | |
| JP | 2007216602 A | 8/2007 | | |
| JP | 2008197223 A | 8/2008 | | |
| JP | 2009166319 A | 7/2009 | | |
| JP | 2009288312 A | * 12/2009 | | |
| JP | 2010196005 A | 9/2010 | | |
| JP | 5828182 B2 | 12/2015 | | |
| JP | 6142714 B2 | 6/2017 | | |
| JP | 2017185668 A | 10/2017 | | |
| JP | 2017215580 A | 12/2017 | | |
| WO | 9800428 A1 | 1/1998 | | |
| WO | WO-2004032099 A1 * | 4/2004 | ............. B42D 25/29 |
| WO | 2007007784 A1 | 1/2007 | | |
| WO | 2007018258 A1 | 2/2007 | | |
| WO | WO-2016043219 A1 * | 3/2016 | ............... G02B 5/26 |
| WO | WO-2016056617 A1 * | 4/2016 | ............. B60K 35/00 |
| WO | WO-2018034215 A1 * | 2/2018 | ........... B42D 25/364 |

OTHER PUBLICATIONS

Jun. 26, 2023, the Extended European Search Report issued by the European Patent Office in the corresponding European Patent Application No. 20832349.3.

Aug. 11, 2020, International Search Report issued in the International Patent Application No. PCT/JP2020/022170.

* cited by examiner

DISPLAY MEDIUM, AUTHENTICITY DETERMINATION METHOD, AND ARTICLE INCLUDING DISPLAY MEDIUM

FIELD

The present invention relates to a display medium, a method for determining authenticity, and an article including the display medium.

BACKGROUND

It is a general practice to attach an identification medium to a target object of which the authenticity is to be determined, the medium being a product that cannot be easily copied. As such an identification medium, a medium using a cholesteric liquid crystal compound, which is a polymer compound, is known (Patent Literature 1).

Also known is an identification medium that has different pieces of information to be visually recognized on the front and back thereof (Patent Literature 2 to 6).

CITATION LIST

Patent Literature

Patent Literature 1: Japanese Patent No. 3652476 B
Patent Literature 2: Japanese Patent Application Laid-Open No. 2017-185668 A
Patent Literature 3: Japanese Patent Application Laid-Open No. 2017-215580 A
Patent Literature 4: Japanese Patent No. 5828182 B
Patent Literature 5: International Publication No. 2007/007784 (Corresponding Foreign Publication: U.S. Patent Application Publication No. 2008/0129036 A1)
Patent Literature 6: Japanese Patent Application Laid-Open No. 2007-216602 A

SUMMARY

Technical Problem

A material having a circularly polarized light separation function is a material having a function of allowing to pass therethrough either one of clockwise circularly polarized light and counterclockwise circularly polarized light, and reflecting part or the entirety of the other circularly polarized light. The image that appears when a display medium using such a material is observed through a clockwise circular polarizing plate is different from the image that appears when the display medium is observed through a counterclockwise circular polarizing plate. Therefore, for the determination of authenticity of an article to which such a display medium is attached, a viewer including two circular polarizing plates, a clockwise circular polarizing plate and a counterclockwise circular polarizing plate, is generally used.

The determination of authenticity using the display medium usually requires the above-mentioned viewer including the two circular polarizing plates, and is therefore costly. Moreover, since it is difficult for general users to obtain the viewer, it is not easy for them to determine the authenticity, and in many cases authenticity determination is performed by genuine product manufacturers, specific retail stores, public institutions, and the like.

Accordingly, there is a demand for a display medium; a method for determining authenticity of a display medium; and an article including a display medium whose authenticity can be determined without use of a special viewer.

Solution to Problem

The present inventor intensively conducted research for solving the above-mentioned problems. As a result, the present inventor has found that the above-mentioned problem can be solved by creating a display medium including a specific first layer and a specific third layer having a circularly polarized light separation function and a second layer that is a phase difference layer. Thus, the present invention has been accomplished.

That is, the present invention provides the following.

<1> A display medium comprising a first layer, a second layer, and a third layer, wherein:
a part or an entirety of the first layer, a part or an entirety of the second layer, and a part or an entirety of the third layer are stacked in a thickness direction in this order;
the first layer is a layer that is capable of reflecting circularly polarized light having a rotation direction D1 and allowing to pass therethrough circularly polarized light having a rotation direction D2, which is a direction opposite to the rotation direction D1;
the second layer is a phase difference layer; and
the third layer is a layer that is capable of reflecting circularly polarized light whose rotation direction is the rotation direction D1 and allowing to pass therethrough circularly polarized light whose rotation direction is the rotation direction D2.

<2> The display medium according to <1>, wherein the first layer is a layer having cholesteric regularity, and the third layer is a layer containing resin flakes that have cholesteric regularity.

<3> The display medium according to <2>, wherein the first layer has a reflectance for unpolarized light of 35% or more and 50% or less in a wavelength range of 420 nm or more and 650 nm or less.

<4> The display medium according to <2> or <3>, wherein the resin flakes contained in the third layer have a reflectance for unpolarized light of 35% or more and 50% or less in a wavelength range of 420 nm or more and 650 nm or less.

<5> The display medium according to any one of <1> to <4>, wherein an in-plane retardation Re of the second layer is 40 nm or more and 1600 nm or less.

<6> A method for determining authenticity comprising:
a step (1) of confirming that the display medium according to any one of <1> to <5> is semi-transparent;
a step (2) of irradiating the display medium with unpolarized light from a side of the third layer, observing from the side of the third layer light reflected by the display medium, and acquiring color information C3 of the third layer;
a step (3) of irradiating the display medium with unpolarized light from a side of the first layer, observing from the side of the first layer light reflected by the display medium, and acquiring color information C1 of the first layer; and
a step (4) of comparing the color information C3 with the color information C1 to determine if the color information C3 and the color information C1 are not the same.

<7> An article comprising the display medium according to any one of <1> to <5>.

Advantageous Effects of Invention

According to the present invention, it is possible to provide a display medium; a method for determining authenticity of a display medium; and an article including a display medium whose authenticity can be determined without use of a special viewer.

DESCRIPTION OF EMBODIMENTS

Figure 1:
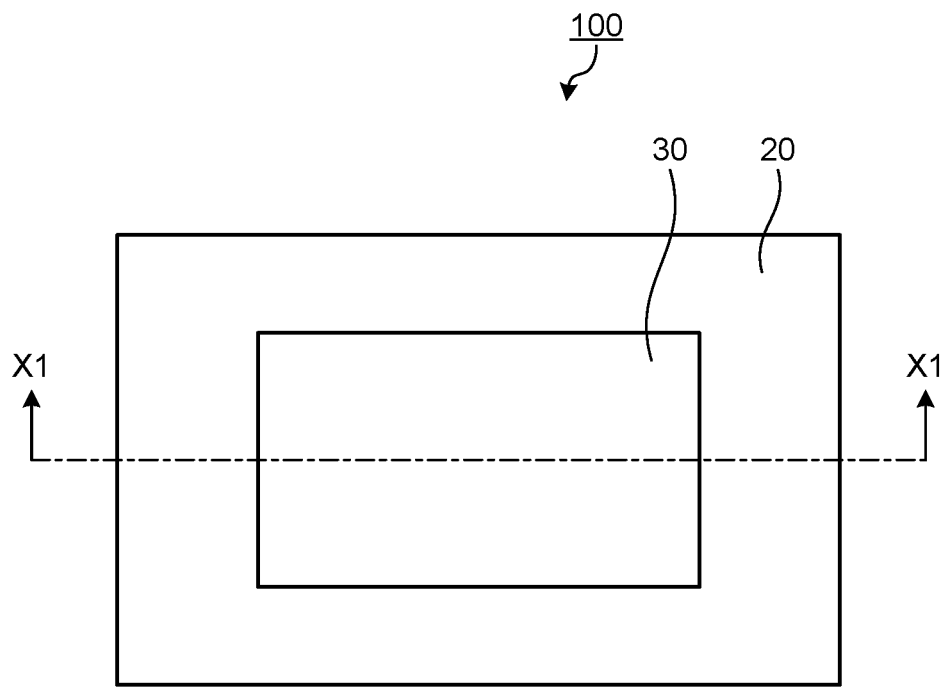
FIG. 1 is a schematic plan view of a display medium according to an embodiment of the present invention as viewed in a thickness direction of the display medium.

Hereinafter, the present invention will be described in detail with reference to embodiments and examples. However, the present invention is not limited to the embodiments and examples described hereinafter, and may be freely modified for implementation without departing from the scope of claims of the present invention and the scope of their equivalents.

In the following description, an in-plane retardation Re of a layer is a value represented by Re=(nx−ny)×d unless otherwise specified. Herein, nx represents a refractive index in a direction in which the maximum refractive index is given among directions perpendicular to the thickness direction of the layer (in-plane directions), ny represents a refractive index in a direction, among the above-mentioned in-plane directions of the layer, perpendicular to the direction giving nx, nz represents a refractive index in a thickness direction of the layer, and d represents the thickness of the layer. The measurement wavelength is 560 nm unless otherwise specified.

In the following description, a material having a positive intrinsic birefringence means a material in which the refractive index in the stretching direction becomes larger than the refractive index in the direction perpendicular to the stretching direction, unless otherwise specified. Further, a material having a negative intrinsic birefringence means a material in which the refractive index in the stretching direction becomes smaller than the refractive index in the direction perpendicular to the stretching direction, unless otherwise specified. The value of the intrinsic birefringence may be calculated from a permittivity distribution.

In the following description, the term "(meth)acryl-" includes "acryl-", "methacryl-", and a combination thereof.

In the following description, the term "(thio)epoxy-" includes "epoxy-", "thioepoxy-", and a combination thereof.

In the following description, the term "iso(thio)cyanate" includes "isocyanate", "isothiocyanate", and a combination thereof.

In the following description, "diffuse reflection" means reflection in directions that are different from a direction of specular reflection.

In the following description, "a visible light region" indicates a wavelength range of 400 nm to 780 nm.

(1. Summary of Display Medium)

The display medium according to an embodiment of the present invention includes a first layer, a second layer, and a third layer.

A part or the entirety of the first layer, a part or the entirety of the second layer, and a part or the entirety of the third layer are stacked in a thickness direction in this order.

The first layer is a layer that is capable of reflecting circularly polarized light having a rotation direction D1 and allowing to pass therethrough circularly polarized light having a rotation direction D2 which is a direction opposite to the rotation direction D1.

The second layer is a phase difference layer.

The third layer is a layer that is capable of reflecting circularly polarized light whose rotation direction is the rotation direction D1 and allowing to pass therethrough circularly polarized light whose rotation direction is the rotation direction D2.

As to the display medium according to the present embodiment having the above-mentioned configuration, when the display medium is irradiated with unpolarized light and reflected light is observed from the side of the first layer and the side of the third layer, the color of the first layer observed from the side of the first layer and the color of the third layer observed from the side of the third layer become different, even without use of any special viewer. Accordingly, the authenticity of the display medium can be determined without use of any special viewer.

(1.1. Configuration of Display Medium)

Hereinbelow, the display medium according to the present embodiment will be described in detail with reference to the drawings.

FIG. 1 is a schematic plan view of a display medium according to an embodiment of the present invention as viewed in a thickness direction of the display medium.

Figure 2:
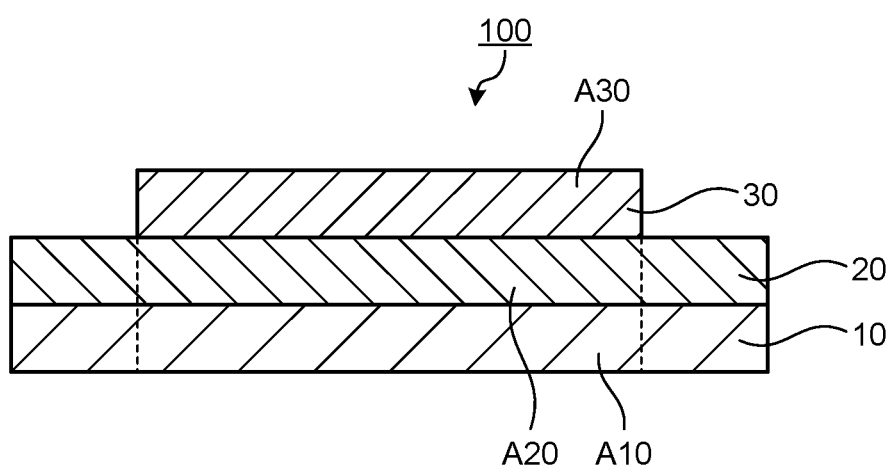
FIG. 2 is a cross-sectional view schematically illustrating a cross-section in the X1-X1 direction in FIG. 1.

FIG. 2 is a cross-sectional view schematically illustrating a cross-section in the X1-X1 direction in FIG. 1.

Figure 3:
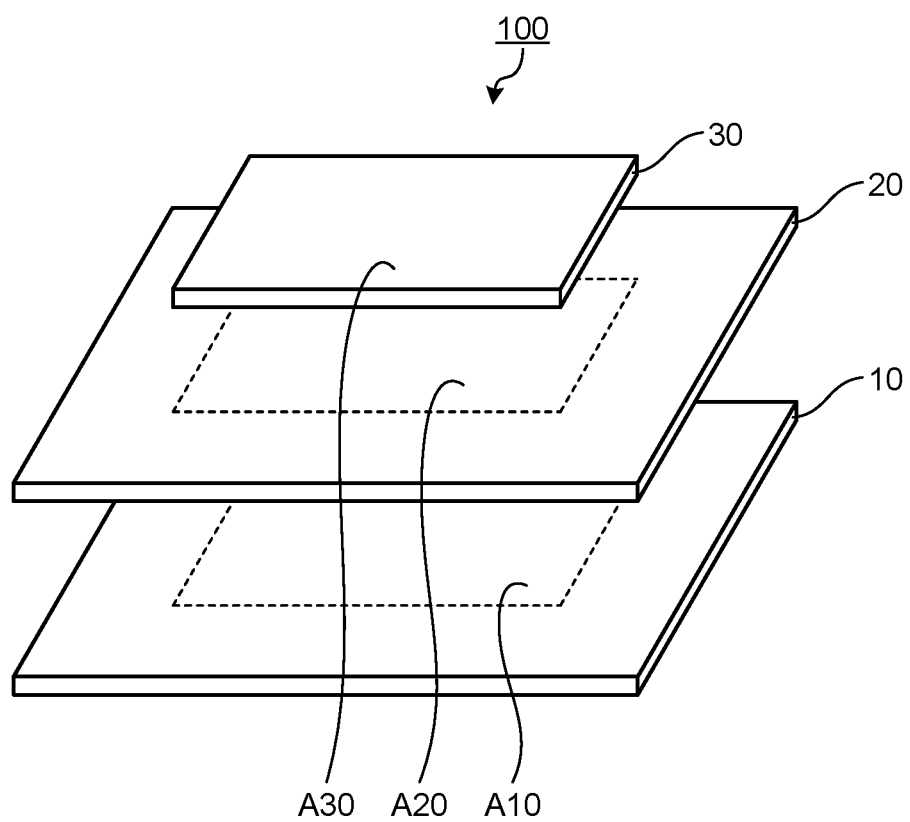
FIG. 3 is an exploded perspective view schematically illustrating the display medium according to the embodiment of the present invention.

FIG. 3 is an exploded perspective view schematically illustrating the display medium according to the embodiment of the present invention.

As illustrated in FIGS. 1 to 3, a display medium 100 includes a first layer 10, a second layer 20, and a third layer 30. As illustrated in FIGS. 1 and 2, the first layer 10 and the second layer 20 are equal in terms of shape and size as viewed in a thickness direction of the display medium 100 (a direction perpendicular to the drawing sheet in FIG. 1). The second layer 20 is in contact with a surface of the first layer 10. The third layer 30 is disposed on an area A20, which is a part of the second layer 20, so as to be in contact with a surface of the second layer 20. As illustrated in FIGS. 2 and 3, an area A10, which is a part of the first layer 10, the area A20, which is a part of the second layer, and an area A30, which is the entirety of the third layer, are stacked in the thickness direction (an up-down direction of the drawing sheet in FIG. 2) in the order of the area A10, the area A20, and the area A30. Herein, being stacked in the thickness direction means that the areas A10 to A30 are in the same planar position as the areas A10 to A30 are viewed in the thickness direction.

Although the first layer 10 and the second layer 20 are equal in terms of shape and size as viewed in the thickness direction of the display medium 100 in the present embodiment, the first layer and the second layer may be different in terms of shape and size.

In another embodiment, an optional layer such as a tackiness layer and a highly-light-transmissive intermediate layer may be provided between the first layer and the second layer, and/or between the second layer and the third layer, unless the optional layer significantly deteriorates the effect of the present invention. The optional layer is preferably a highly-light-transmissive layer, more preferably a layer having a total light transmittance of 80% or more, and still more preferably a layer having a total light transmittance of 85% or more. The optional layer is preferably a layer having a low in-plane retardation Re (for example, 0 nm or more and 5 nm or less). Specific examples of the material constituting such a layer which is highly light-transmissive and which has a low retardation Re may include rigid polyvinyl chloride, flexible polyvinyl chloride, an acrylic resin, and glass.

In still another embodiment, the display medium may further include a first outside layer and/or a second outside layer unless the first outside layer and the second outside layer significantly deteriorate the effect of the present invention. Each of the first outside layer and the second outside layer is preferably a highly-light-transmissive layer, more preferably a layer having a total light transmittance of 80% or more, and still more preferably a layer having a total light transmittance of 85% or more. Specific examples of the material constituting the first outside layer and the second outside layer may include rigid polyvinyl chloride, flexible polyvinyl chloride, acrylic resin, glass, polycarbonate (PC), and polyethylene terephthalate (PET) and may optionally be selected depending on the application, required texture, durability, and mechanical strength of the display medium. Independently from each other, the first outside layer and the second outside layer may be a layer having a low in-plane retardation Re (for example, 0 nm or more and 5 nm or less), and may be a layer having an in-plane retardation of 5 nm or more, for example. The in-plane retardation Re of the first outside layer and the second outside layer may be 600 nm or less.

Examples of the layer configuration of the display medium further including the first outside layer and/or the second outside layer may include the following configurations.

In the display medium, the first outside layer, the first layer, the second layer, the third layer, and the second outside layer are disposed in this order.

In the display medium, the first outside layer, the first layer, the second layer, and the third layer are disposed in this order.

In the display medium, the first layer, the second layer, the third layer, and the second outside layer are disposed in this order.

Although the third layer 30 is formed in a rectangular shape as viewed in the thickness direction of the display medium 100 in the present embodiment, the third layer 30 may have a pattern of a character, a number, a graphic figure, or the like as viewed in the thickness direction of the display medium 100 in another embodiment.

(1.2. First Layer and Third Layer)

Each of the first layer and the third layer is a layer that is capable of reflecting circularly polarized light having the rotation direction D1 and allowing to pass therethrough circularly polarized light having the rotation direction D2 which is a direction opposite to the rotation direction D1. Herein, the reflection may be specular reflection or diffuse reflection. The third layer is preferably a layer that is capable of causing diffuse reflection of circularly polarized light having the rotation direction D1. In a case where the third layer is a layer that is capable of causing diffuse reflection of circularly polarized light having the rotation direction D1, the third layer may have a concavo-convex surface to serve as a layer that is capable of causing diffuse reflection of circularly polarized light, or as described later, the third layer may be a layer containing resin flakes to serve as a layer that is capable of causing diffuse reflection of circularly polarized light.

The rotation direction D1 of circularly polarized light may be counterclockwise or clockwise. Therefore, each of the first layer and the third layer may be a layer that is capable of reflecting counterclockwise circularly polarized light and allowing to pass therethrough clockwise circularly polarized light or a layer that is capable of reflecting clockwise circularly polarized light and allowing to pass therethrough counterclockwise circularly polarized light.

Each of the first layer and the third layer may be a layer that is capable of reflecting the entirety of irradiated circularly polarized light having the rotation direction D1 or a layer that is capable of reflecting part of the circularly polarized light having the rotation direction D1.

Alternatively, each of the first layer and the third layer may be a layer that allows to pass therethrough the entirety of irradiated circularly polarized light having the rotation direction D2 or a layer that is capable of reflecting part of the circularly polarized light having the rotation direction D2.

The first layer and the third layer may be made of the same material, or may be made of different materials from each other.

For the first layer, a layer having cholesteric regularity (for example, a resin layer having cholesteric regularity) may be used. Also, for the third layer, a layer containing resin flakes having cholesteric regularity may be used.

The cholesteric regularity, which the resin layer having the cholesteric regularity has, is a structure in which the angles of molecular axes in stacking planes are shifted (twisted) as the planes are observed sequentially passing through the stacked planes, such that molecular axes in a first plane are oriented in a certain direction, molecular axes in a subsequent plain stacking on the first plane are oriented in a direction shifted by a small angle with respect to that of the first plane, and molecular axes in still another plane are oriented in a direction of a further shifted angle. That is, in a case where molecules in the layer have the cholesteric regularity, the molecules are arrayed so as to form a large number of molecular layers in the resin layer. In one layer A among such a large number of molecular layers, the molecules are arrayed such that the axes of the molecules are directed in a certain direction. In the layer B adjacent thereto, the molecules are arrayed in a direction that is angularly shifted from the direction in the layer A, and in the further adjacent layer C, the molecules are arrayed in a direction that is angularly shifted from the direction in the layer B. In this manner, in a large number of molecular layers, the angles of the axes of the molecules are continuously shifted to form a structure in which the molecules are twisted. Such a structure in which the direction of molecular axes is twisted becomes an optically chiral structure.

Hereinbelow, a resin layer having cholesteric regularity is also referred to as a cholesteric resin layer.

The cholesteric resin layer usually has a circularly polarized light separation function. That is, the cholesteric resin layer has a property of allowing to pass therethrough either one of clockwise circularly polarized light and counterclockwise circularly polarized light, and reflecting part or the entirety of the other circularly polarized light. The reflection by the cholesteric resin layer is a reflection of circularly polarized light where the chirality of the circularly polarized light is maintained.

The wavelength that exerts the circularly polarized light separation function depends on the pitch of a helical structure in the cholesteric resin layer. The pitch of the helical structure is the distance in the plane normal direction in the helical structure from an original plane to another plane in which the angle of the direction of the molecular axis that has been gradually and continuously shifted as proceeding through the planes from the original plane returns to the original molecular axis direction again. By changing the size of the pitch of the helical structure, it is possible to change the wavelength at which the circularly polarized light separating function is exerted.

The cholesteric resin layer may be obtained, for example, by forming a film of a cholesteric liquid crystal composition on a supporting body appropriate for formation of the resin layer and curing the film of the cholesteric liquid crystal composition. The obtained layer as it is may be used as the cholesteric resin layer. The cholesteric resin layer is a layer of a film of a material itself that is capable of reflecting either one of clockwise circularly polarized light and counterclockwise circularly polarized light, and allowing the other circularly polarized light to pass therethrough. Therefore, the cholesteric resin layer itself may be used as the first layer.

An example for the cholesteric liquid crystal composition that may be used for forming the cholesteric resin layer is a composition that contains a liquid crystal compound and that is capable of exhibiting a cholesteric liquid crystal phase when the film is formed on the supporting body. Herein, as the liquid crystal compound, a liquid crystal compound which is a polymer compound, and a polymerizable liquid crystal compound, can be used. To achieve high thermal stability, the polymerizable liquid crystal compound is preferably used. By polymerizing such a polymerizable liquid crystal compound in a state of exhibiting cholesteric regularity, the film of the cholesteric liquid crystal compound can be cured, to thereby obtain a non-liquid crystal resin layer that is cured keeping the state of exhibiting cholesteric regularity.

The resin flake having cholesteric regularity is a small piece made of a resin and having cholesteric regularity. The small piece having cholesteric regularity is capable of reflecting either one of clockwise circularly polarized light and counterclockwise circularly polarized light, and allowing the other circularly polarized light to pass therethrough. The layer containing an aggregate of the small pieces is capable of causing diffuse reflection of either one of clockwise circularly polarized light and counterclockwise circularly polarized light, and allowing the other circularly polarized light to pass therethrough.

Even in a case where the cholesteric resin layer is formed into crushed pieces, the crushed pieces are capable of reflecting either clockwise circularly polarized light or counterclockwise circularly polarized light and allowing to pass therethrough the other circularly polarized light in at least a part of a visible light region. Therefore, the crushed pieces are preferably used as the resin flakes having cholesteric regularity.

In a case where the cholesteric resin layer is used as the first layer, and where the resin flakes are used as a material for the third layer, the resin flakes may be crushed pieces obtained by crushing another resin layer that is different from the cholesteric resin layer serving as the first layer.

However, from a viewpoint of using the same material to suppress the production cost, the resin flakes used as the material for the third layer are preferably crushed pieces obtained by crushing the same layer as the cholesteric resin layer used as the first layer.

The resin flake having cholesteric regularity may be produced from the cholesteric resin layer by a method for producing a peeled-off piece described in Japanese Patent No. 6142714 B, for example.

A flake made of a material having no polarization property may be used together with the resin flake having cholesteric regularity. Examples of the flakes having no polarization property may include one or more types of flake selected from carbon black, and oxide, nitride, and oxynitride of a metal belonging to any of Groups 3 to 11 of Period 4 in the Periodic Table of the Elements. As these flakes, one type thereof may be solely used, and two or more types thereof may also be used in combination at any ratio.

In a case where the first layer is a layer having cholesteric regularity, the first layer preferably has a reflectance for unpolarized light of 35% or more and 50% or less in a wavelength range of 420 nm or more and 650 nm or less.

Accordingly, the first layer can have a favorable polarized light separation function in a broad visible light wavelength range of 420 nm or more and 650 nm or less, and as a result, the color of the third layer observed from the side of the first layer can be brighter.

In addition, in a case where the third layer is a layer containing resin flakes having cholesteric regularity, the resin flakes contained in the third layer preferably have a reflectance for unpolarized light of 35% or more and 50% or less in a wavelength range of 420 nm or more and 650 nm or less. Accordingly, the resin flakes effectively cause diffuse reflection of light. As a result, it is possible to achieve still easier recognition of the color difference between light that is visually recognized upon observation of the display medium from the side of the first layer and light that is visually recognized upon observation of the display medium from a side of the third layer.

Herein, the reflectance of the cholesteric resin layer which is a material for the resin flakes may be measured, and the measured value may be adopted as the value for the reflectance of the resin flakes.

Examples of the suitable cholesteric resin layer which has a high reflectance in a wavelength range of 420 nm or more and 650 nm or less may include (i) a cholesteric resin layer in which the size of the pitch of the helical structure is altered in a stepwise manner, and (ii) a cholesteric resin layer in which the size of the pitch of the helical structure is continuously altered.

(i) The cholesteric resin layer in which the size of the pitch of the helical structure is altered in a stepwise manner may be obtained by forming a plurality of cholesteric resin layers having helical structures with different pitches. As a specific example, such a cholesteric resin layer may be produced by preparing a plurality of cholesteric resin layers having helical structures with different pitches in advance and then attaching the respective layers to each other via a tackiness agent or an adhesive agent. Alternatively, such a cholesteric resin layer may be produced by forming a cholesteric resin layer and sequentially forming other cholesteric resin layers on the cholesteric resin layer.

(ii) The cholesteric resin layer in which the size of the pitch of the helical structure is continuously altered is not particularly limited by its method for producing thereof. A preferable example of the method for producing such a cholesteric resin layer may be a method of applying a cholesteric liquid crystal composition, containing a polymerizable liquid crystal compound for forming the cholesteric resin layer preferably onto another layer such as an orientation film, to obtain a layer of the liquid crystal composition, and then conducting light irradiation and/or a heating treatment once or more times to cure the layer while keeping the state of the pitch of the helical structure being continuously altered. Such an operation is called a bandwidth broadening treatment since the operation is an operation that broadens the reflection bandwidth of the cholesteric resin layer. The bandwidth broadening treatment is preferable since, by conducting the bandwidth broadening treatment, a broad reflection bandwidth can be achieved even in a cholesteric resin layer that is as thin as, e.g., 10 μm or less.

As a preferable embodiment of such a cholesteric liquid crystal composition to be subjected to the bandwidth broadening treatment, a cholesteric liquid crystal composition (X) described in detail below may be mentioned.

As the cholesteric resin layer in which the size of the pitch of the helical structure is continuously altered, one layer thereof may be solely used, and a plurality of layers thereof in a stacked manner may also be used. An example of the cholesteric resin layer for use may be a layer that is a combination of a cholesteric resin layer exerting a circularly polarized light separation function in a partial region in the visible light region and another cholesteric resin layer exerting a circularly polarized light separation function in another region, to thereby exert a circularly polarized light separation function in a broad region of the visible light region.

In this manner, the cholesteric resin layer may be a resin layer including one layer or a resin layer including two or more layers. In a case where the cholesteric resin layer includes two or more layers, the cholesteric resin layer may include two or more cholesteric resin layers described in (i), may include two or more cholesteric resin layers described in (ii), or may include two or more layers that are a combination of the two types. From a viewpoint of facilitation of producing, the number of layers constituting the cholesteric resin layer is preferably 1 to 100 layers, and more preferably 1 to 20 layers. In a case where a cholesteric resin layer having a high reflectance with only one single layer is obtained as a result of the above-mentioned bandwidth broadening treatment, the display medium with the preferable aspect can be obtained by using the single layer.

The cholesteric liquid crystal composition (X) contains a polymerizable non-liquid crystal compound represented by the following formula (1) and a specific polymerizable liquid crystal compound. As each of the non-liquid crystal compound represented by the following formula (1) and the polymerizable liquid crystal compound, one type thereof may be solely used, and two or more types thereof may also be used in combination at any ratio.

Hereinafter, the respective components will be described in sequence.

$$R^1-A^1-B-A^2-R^2 \quad (1)$$

In the formula (1), $R^1$ and $R^2$ are each independently selected from the group consisting of a linear or branched alkyl group of 1 to 20 carbon atoms, a linear or branched alkylene oxide group of 1 to 20 carbon atoms, a hydrogen atom, a halogen atom, a hydroxyl group, a carboxyl group, a (meta)acrylic group, an epoxy group, a mercapto group, an isocyanate group, an amino group, and a cyano group.

The alkyl group and the alkylene oxide group may be unsubstituted or substituted with one or more halogen atoms. The halogen atom, hydroxyl group, carboxyl group, (meta)acrylic group, epoxy group, mercapto group, isocyanate group, amino group, and cyano group may be bonded to an alkyl group and an alkylene oxide group of 1 to 2 carbon atoms.

Preferable examples of $R^1$ and $R^2$ may include a halogen atom, a hydroxyl group, a carboxyl group, a (meth)acrylic group, an epoxy group, a mercapto group, an isocyanate group, an amino group, and a cyano group.

At least one of $R^1$ and $R^2$ is preferably a reactive group. When the polymerizable non-liquid crystal compound represented by the above-mentioned formula (1) has a reactive group as at least one of $R^1$ and $R^2$, the polymerizable non-liquid crystal compound is fixed in the cholesteric resin layer at the time of curing, so that a stronger layer can be formed. Herein, examples of the reactive group may include a carboxyl group, a (meth)acrylic group, an epoxy group, a mercapto group, an isocyanate group, and an amino group, and these groups may be accompanied by any intervening group.

In the formula (1), $A^1$ and $A^2$ each independently represent a group selected from the group consisting of a 1,4-phenylene group, a 1,4-cyclohexylene group, a cyclohexene-1,4-diyl group, a 4,4'-biphenylene group, a 4,4'-bicyclohexylene group, and a 2,6-naphthylene group. The 1,4-phenylene group, 1,4-cyclohexylene group, cyclohexene-1,4-diyl group, 4,4'-biphenylene group, 4,4'-bicyclohexylene group, and 2,6-naphthylene group are not substituted or may be substituted with one or more substituents such as a halogen atom, a hydroxyl group, a carboxyl group, a cyano group, an amino group, a C1 to C10 alkyl group and a halogenated alkyl group. When two or more substituents are present in each of $A^1$ and $A^2$, they may be the same as, or different from, each other.

Particularly preferable examples as $A^1$ and $A^2$ may include groups selected from the group consisting of a 1,4-phenylene group, a 4,4'-biphenylene group, and a 2,6-naphthylene group. These aromatic ring skeletons are relatively rigid compared to alicyclic skeletons, and the affinity of the groups to mesogens of the polymerizable liquid crystal compound is high and the orientation uniformity becomes higher.

In the formula (1), B is selected from the group consisting of a single bond, —O—, —S—, —S—S—, —CO—, —CS—, —OCO—, —CH$_2$—, —OCH$_2$—, —CH=N—N=CH—, —NHCO—, —OCOO—, —CH$_2$COO—, and —CH$_2$OCO—.

Particularly preferable examples as B may include a single bond, —OCO—, and —CH=N—N=CH—.

It is preferable that the compound of the formula (1) has chirality. Furthermore, it is preferable that the cholesteric liquid crystal composition (X) contains a mixture of a plurality of optical isomers as the compound of the formula (1). For example, the cholesteric liquid crystal composition (X) may contain a mixture of a plurality of types of enantiomers and/or diastereomers. It is preferable that at least one of the compounds of the formula (1) has a melting point within a range of 50° C. to 150° C.

It is preferable that the compound of the formula (1) has a high Δn. When a compound having a high Δn is used as the compound of the formula (1), Δn as the cholesteric liquid crystal composition (X) can be improved, and a cholesteric resin layer capable of reflecting circularly polarized light with a wide wavelength range can be produced. The Δn of at least one of the compounds of the formula (1) is preferably 0.18 or more, and more preferably 0.22 or more. The upper limit value of Δn may be, for example, 0.50 or less.
Particularly preferable specific examples of the compound of the formula (1) may include the following compounds (A1) to (A10).
(Chemical formulae 1)
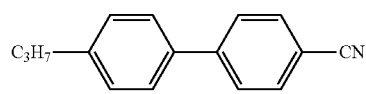
(A1)
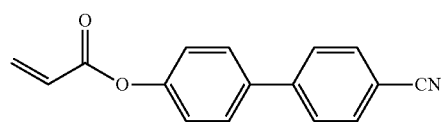
(A2)
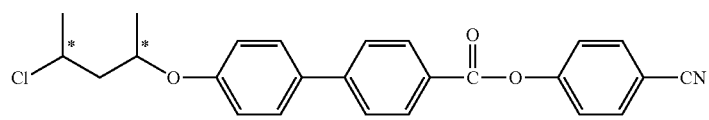
(A3)
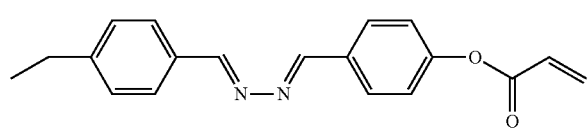
(A4)
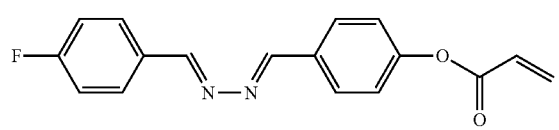
(A5)
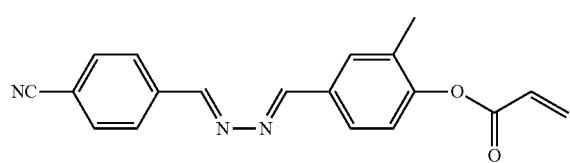
(A6)
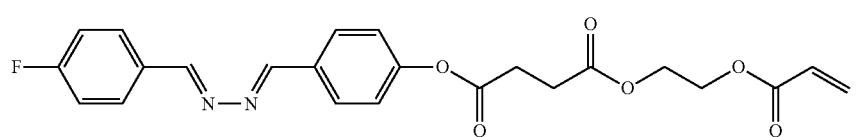
(A7)
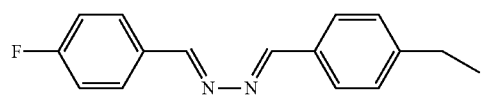
(A8)
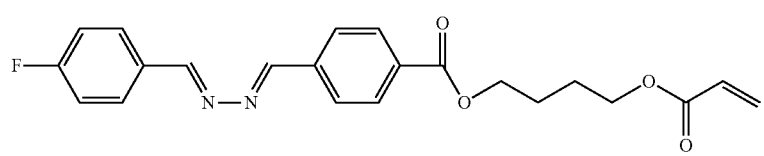
(A9)
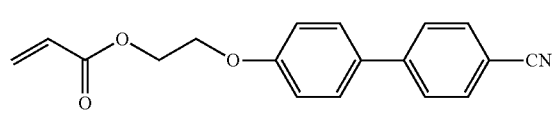
(A10)

In the above-mentioned compound (A3), "*" represents a chiral center.

The cholesteric liquid crystal composition (X) usually contains a polymerizable liquid crystal compound with at least two or more reactive groups per molecule.

Examples of the polymerizable liquid crystal compound may include compounds represented by the formula (2):

$$R^3\text{—}C^3\text{-}D^3\text{-}C^5\text{-}M\text{-}C^6\text{-}D^4\text{-}C^4\text{—}R^4 \qquad (2)$$

In the formula (2), $R^3$ and $R^4$ are reactive groups, each independently representing a group selected from the group consisting of a (meth)acrylic group, a (thio)epoxy group, an oxetane group, a thietanyl group, an aziridinyl group, a pyrrole group, a vinyl group, an allyl group, a fumarate group, a cinnamoyl group, an oxazoline group, a mercapto group, an iso(thio)cyanate group, an amino group, a hydroxyl group, a carboxyl group, and an alkoxysilyl group. When the polymerizable liquid crystal compound has these reactive groups, a cured product having a film strength capable of withstanding practical use can be obtained by curing of the cholesteric liquid crystal composition.

In the formula (2), $D^3$ and $D^4$ represent a group selected from the group consisting of a single bond, a linear or branched alkyl group of 1 to 20 carbon atoms, and a linear or branched alkylene oxide group of 1 to 20 carbon atoms.

In the formula (2), $C^3$ to $C^6$ represent a group selected from the group consisting of a single bond, —O—, —S—, —S—S—, —CO—, —CS—, —OCO—, —CH$_2$—, —OCH$_2$—, —CH=N—N=CH—, —NHCO—, —OCOO—, —CH$_2$COO—, and —CH$_2$OCO—.

In the formula (2), M represents a mesogen group. In particular, M represents a group obtained by bonding 2 to 4 skeletons selected from the group of azomethines, azoxies, phenyls, biphenyls, terphenyls, naphthalenes, anthracenes, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles, which may or may not be substituted, via a bonding group such as —O—, —S—, —S—S—, —CO—, —CS—, —OCO—, —CH$_2$—, —OCH$_2$—, —CH=N—N=CH—, —NHCO—, —OCOO—, —CH$_2$COO—, and —CH$_2$OCO—.

Examples of the substituents which the mesogen group M may have may include a halogen atom, an alkyl group of 1 to 10 carbon atoms optionally having a substituent, a cyano group, a nitro group, —O—R$^5$, —O—C(=O)—R$^5$, —C(=O)—O—R$^5$, —O—C(=O)—O—R$^5$, —NR$^5$—C(=O)—R$^5$, —C(=O)—NR$^5$R$^7$, and —O—C(=O)—NR$^5$R$^7$. Herein, R$^5$ and R$^7$ represent a hydrogen atom or an alkyl group of 1 to 10 carbon atoms. When R$^5$ and R$^7$ are an alkyl group, the alkyl group may have —O—, —S—, —O—C(=O)—, —C(=O)—O—, —O—C(=O)—O—, —NR$^6$—C(=O)—, —C(=O)—NR$^6$—, —NR$^6$—, or —C(=O)— intervened therein (except cases where two or more adjacent —O—'s or —S—'s are present as an intervening group). Herein, R$^6$ represents a hydrogen atom or an alkyl group of 1 to 6 carbon atoms.

Examples of the substituents in the above-mentioned "alkyl group of 1 to 10 carbon atoms optionally having a substituent" may include a halogen atom, a hydroxyl group, a carboxyl group, a cyano group, an amino group, an alkoxy group of 1 to 6 carbon atoms, an alkoxyalkoxy group of 2 to 8 carbon atoms, an alkoxyalkoxyalkoxy group of 3 to 15 carbon atoms, an alkoxycarbonyl group of 2 to 7 carbon atoms, an alkylcarbonyloxy group of 2 to 7 carbon atoms, and an alkoxycarbonyloxy group of 2 to 7 carbon atoms.

It is preferable that the polymerizable liquid crystal compound has an asymmetric structure. Herein, the asymmetric structure refers to a structure in which $R^3$—$C^3$-$D^3$-$C^5$— and —$C^6$-$D^4$-$C^4$—$R^4$ differ from each other in the formula (2) about the mesogen group M as its center. By using the compound with an asymmetric structure as the polymerizable liquid crystal compound, it is possible to further enhance the orientation uniformity.

The Δn of the polymerizable liquid crystal compound is preferably 0.18 or more, and more preferably 0.22 or more. When a polymerizable liquid crystal compound with the Δn value of 0.30 or more is used, the absorption edge of the ultraviolet absorption spectrum on the long wavelength side may extend to the visible range. However, polymerizable liquid crystal compounds of which the absorption edge of the spectrum extends to the visible range may also be used as long as the spectrum does not adversely affect the desired optical performance. By using such a polymerizable liquid crystal compound with such a high Δn, a cholesteric resin layer having high optical performance (e.g., selective reflection performance of circularly polarized light) can be obtained. The upper limit value of Δn may be, for example, 0.50 or less.

Preferable specific examples of the polymerizable liquid crystal compound may include the following compounds (B1) to (B9). However, the polymerizable liquid crystal compound is not limited to the following compounds.

(Chemical formulae 2)

(B1)

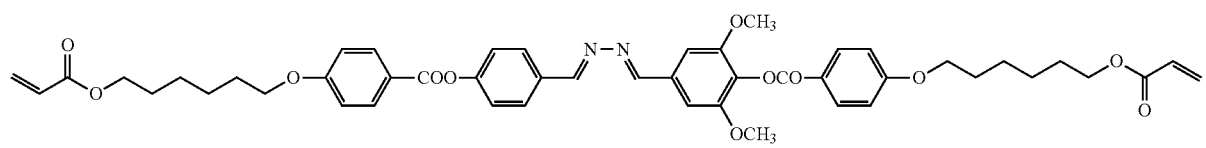

(B2)

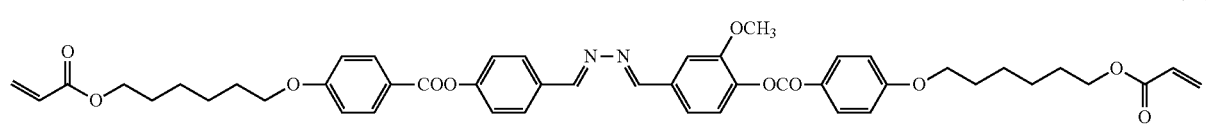

-continued (B3)
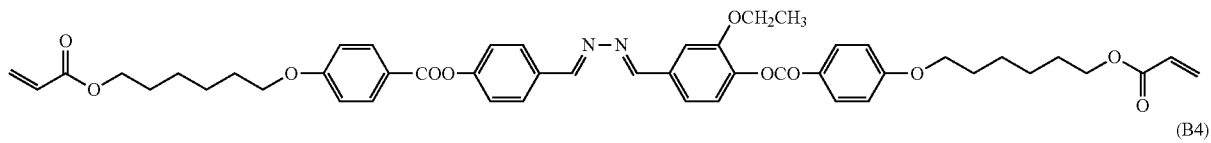

(B4)
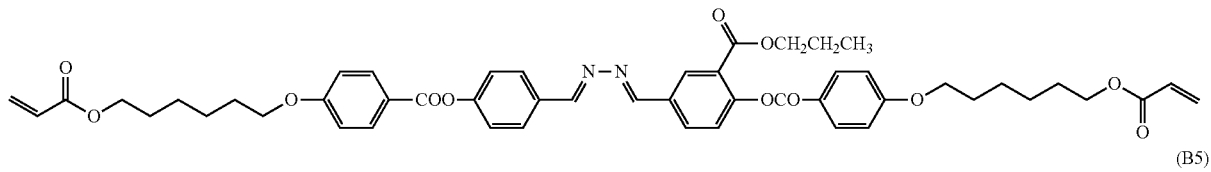

(B5)
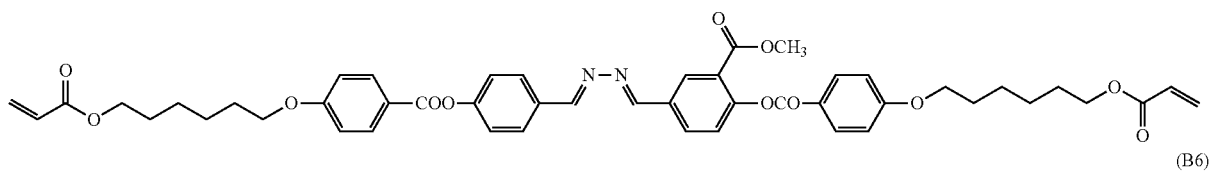

(B6)
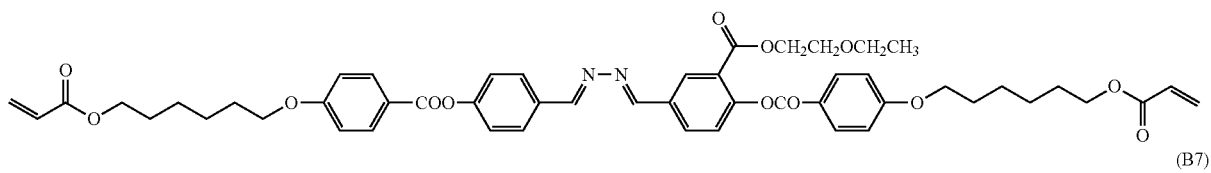

(B7)
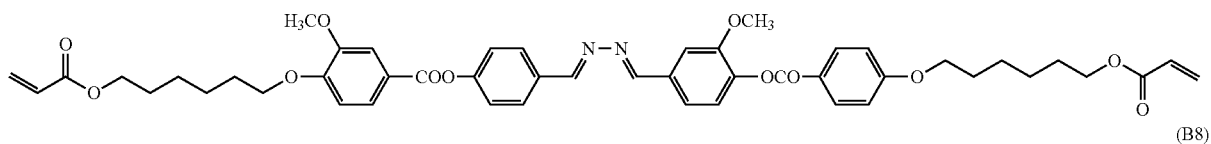

(B8)
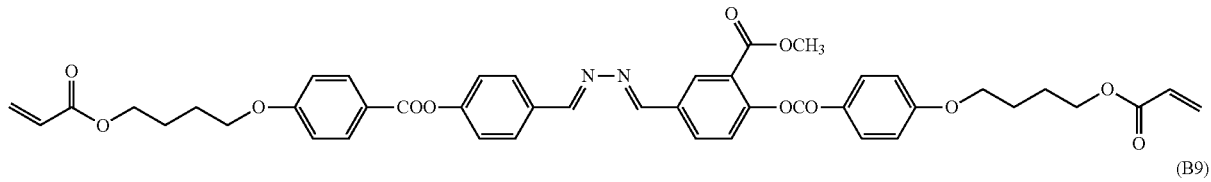

(B9)

In the cholesteric liquid crystal composition (X), the weight ratio of (total weight of the polymerizable non-liquid crystal compound of the formula (1))/(total weight of the polymerizable liquid crystal compound) is preferably 0.05 or more, more preferably 0.1 or more, and particularly preferably 0.15 or more, and is preferably 1 or less, more preferably 0.65 or less, and particularly preferably 0.45 or less. By setting the weight ratio to the lower limit value of the above-mentioned range or more, the orientation uniformity can be enhanced. By setting the weight ratio to the upper limit value or less, the orientation uniformity as well as the stability of the liquid crystal phase can be enhanced. Furthermore, it is possible to stably obtain a desired optical performance (for example, a characteristic of selectively reflecting circularly polarized light) by increasing the Δn as the liquid crystal composition. Herein, the total weight indicates the weight of a compound when one type thereof is used, and indicates the total weight when two or more types of compounds are used.

In the cholesteric liquid crystal composition (X), the molecular weight of the compound of the formula (1) is preferably less than 600, and the molecular weight of the polymerizable liquid crystal compound is preferably 600 or more. With this configuration, the compound of the formula (1) can enter into the gap of the polymerizable liquid crystal compound having a molecular weight larger than that of the compound of the formula (1), and the orientation uniformity can be improved.

Cholesteric liquid crystal compositions such as the cholesteric liquid crystal composition (X) may optionally contain a crosslinking agent for improving film strength and durability after curing. As the crosslinking agent, those which are capable of reacting simultaneously at the time of curing the film of the cholesteric liquid crystal composition, accelerating the reaction when a heat treatment is applied after curing, or causing spontaneous proceeding of the reaction by moisture to thereby enhance the crosslinking density of the cholesteric resin layer and to prevent deterioration of the orientation uniformity can be appropriately selected and used. Therefore, for example, an optional crosslinking agent which causes curing of the composition with ultraviolet rays, heat, moisture, or the like may be suitably used. Examples of the crosslinking agent may include a polyfunctional acrylate compound; an epoxy compound; an isocyanate compound; a polyoxazoline compound; and an alkoxysilane compound. As the crosslinking agent, one type thereof may be solely used, and two or more types thereof may also be used in combination at any ratio. A known catalyst may be used depending on the reactivity of the crosslinking agent. By using a catalyst, productivity can be improved in addition to the improvement in film strength and durability of the cholesteric resin layer.

The cholesteric liquid crystal composition may optionally contain a photoinitiator. As the photoinitiator, for example, a publicly known compound that generates a radical or an acid by ultraviolet or visible light may be used. Specific examples of the photoinitiator may include benzoin, benzyl dimethyl ketal, benzophenone, biacetyl, acetophenone, Michler's ketone, benzyl, benzyl isobutyl ether, tetramethyl thiuram mono (di) sulfide, 2,2-azobisisobutyronitrile, 2,2-azobis-2,4-dimethylvaleronitrile, benzoyl peroxide, di-tert-butyl peroxide, 1-hydroxycyclohexyl phenyl ketone, 2-hydroxy-2-methyl-1-phenyl-propane-1-one, 1-(4-isopropylphenyl)-2-hydroxy-2-methylpropane-1-one, thioxanthone, 2-chlorothioxanthone, 2-methylthioxanthone, 2,4-diethylthioxanthone, methylbenzoylformate, 2,2-diethoxyacetophenone, β-ionone, β-bromostyrene, diazoaminobenzene, α-amylcinnamic aldehyde, p-dimethylaminoacetophenone, p-dimethylaminopropiophenone, 2-chlorobenzophenone, p,p'-dichlorobenzophenone, p,p'-bis-diethylaminobenzophenone, benzoin ethyl ether, benzoin isopropyl ether, benzoin n-propyl ether, benzoin n-butyl ether, diphenyl sulfide, bis(2,6-methoxybenzoyl)-2,4,4-trimethyl-pentylphosphine oxide, 2,4,6-trimethylbenzoyldiphenyl-phosphine oxide, bis(2,4,6-trimethylbenzoyl)-phenylphosphine oxide, 2-methyl-1(4-(methylthio)phenyl)-2-morpholinopropane-1-one, 2-benzyl-2-dimethylamino-1-(4-morpholinophenyl)-butane-1-one, anthracene benzophenone, α-chloroanthraquinone, diphenyldisulfide, hexachlorobutadiene, pentachlorobutadiene, octachlorobutene, 1-chlormethylnaphthalene, 1,2-octanedione, 1-(4-(phenylthio)phenyl-2-(o-benzoyloxime)), carbazoleoxime compounds such as 1-(9-ethyl-6-(2-methylbenzoyl)-9H-carbazol-3-yl)ethanone 1-(o-acetyloxime), (4-methylphenyl) (4-(2-methylpropyl)phenyl)iodonium hexafluorophosphate, 3-methyl-2-butynyltetramethylenesulfonium hexafluoroantimonate, and diphenyl-(p-phenylthiophenyl)sulfonium hexafluoroantimonate. As these compounds, one type thereof may be solely used, and two or more types thereof may also be used in combination at any ratio. If necessary, a tertiary amine compound as a known photosensitizer or polymerization accelerator may be used to control curability.

The amount of the photoinitiator is preferably 0.03% by weight to 7% by weight in the cholesteric liquid crystal composition. By setting the amount of the photoinitiator to the lower limit value of the above-mentioned range or more, the degree of polymerization can be increased, so that the film strength of the cholesteric resin layer can be increased. By setting the amount to the upper limit value or less, the orientation of the liquid crystal material can be improved, so that the liquid crystal phase of the cholesteric liquid crystal composition can be stabilized.

The cholesteric liquid crystal composition may optionally contain a surfactant. As the surfactant, for example, those which do not deteriorate orientation may be appropriately selected and used. Preferable examples of such a surfactant may include a nonionic surfactant containing a siloxane or a fluorinated alkyl group in a hydrophobic group moiety. Among these, an oligomer having two or more hydrophobic group moieties per molecule is particularly suitable. Specific examples of these surfactants may include PolyFox PF-151N, PF-636, PF-6320, PF-656, PF-6520, PF-3320, PF-651, and PF-652 available from OMNOVA Solutions Inc.; Ftergent FTX-209F, FTX-208G, and FTX-204D available from Neos Co., Ltd.; and Surflon KH-40 available from AGC Seimi Chemical Co., Ltd. As the surfactants, one type thereof may be solely used, and two or more types thereof may also be used in combination at any ratio.

The amount of the surfactant is preferably set such that the amount of the surfactant in the cured film obtained by curing of the cholesteric liquid crystal composition is 0.05% by weight to 3% by weight. By setting the amount of the surfactant to the lower limit value of the above-mentioned range or more, the orientation regulating force at the air interface can be increased, and therefore, orientation defects can be suppressed. By setting the amount to the upper limit value or less, it is possible to suppress the decrease in the orientation uniformity due to the excessive surfactant entering between the liquid crystal molecules.

The cholesteric liquid crystal composition may optionally contain a chiral agent. Usually, the twisting direction of the cholesteric resin layer may be appropriately selected depending on the type and structure of the chiral agent to be used. In a case where the twist is desired to be in the clockwise direction, a chiral agent for imparting dextrorotation may be used, and in a case where the twist is desired to be in the counterclockwise direction, a chiral agent for imparting levorotation may be used, for achieving the desired twisting. Specific examples of the chiral agent for appropriate usage may include those described in Japanese Patent Application Laid-Open No. 2005-289881 A, Japanese Patent Application Laid-Open No. 2004-115414 A, Japanese Patent Application Laid-Open No. 2003-66214 A, Japanese Patent Application Laid-Open No. 2003-313187 A, Japanese Patent Application Laid-Open No. 2003-342219 A, Japanese Patent Application Laid-Open No. 2000-290315 A, Japanese Patent Application Laid-Open No. Hei. 6-072962 A, U.S. Pat. No. 6,468,444, International Publication No. 98/00428, Japanese Patent Application Laid-Open No. 2007-176870 A and the like. For example, Paliocolor LC756 from BASF may be available. As the chiral agents, one type thereof may be solely used, and two or more types thereof may also be used in combination at any ratio.

The amount of the chiral agent may be optionally set within a range in which the chiral agent does not decrease the desired optical performance. The specific amount of the chiral agent is usually 1% by weight to 60% by weight in the cholesteric liquid crystal composition.

If necessary, the cholesteric liquid crystal composition may further contain other optional components. Examples of the optional component may include a solvent, a polymerization inhibitor for improving pot life, an antioxidant for improving durability, an ultraviolet absorber, and a light stabilizer. As the optional components, one type thereof may be solely used, and two or more types thereof may also be used in combination at any ratio. The amount of these optional components may be freely set within a range in which the optional components do not decrease the desired optical performance.

The method for producing the cholesteric liquid crystal composition is not particularly limited, and the production may be performed by mixing the above-mentioned components.

The cholesteric resin layer may be obtained, for example, by subjecting a surface of a supporting body made of a film of a transparent resin or the like to a treatment such as a corona discharge treatment and a rubbing treatment if necessary, further providing an orientation film if necessary, further providing a film of a cholesteric liquid crystal composition on this surface, and further performing an orientation treatment and/or a curing treatment if necessary.

The application of the cholesteric liquid crystal composition on the supporting body or on the orientation film may be performed by a publicly known method such as an extrusion coating method, a direct gravure coating method, a reverse gravure coating method, a die coating method, and a bar coating method.

The orientation treatment may be performed by, e.g., warming a film of a cholesteric liquid crystal composition at 50° C. to 150° C. for 0.5 minute to 10 minutes. By subjecting the film to the orientation treatment, the cholesteric liquid crystal composition in the film can be well oriented.

The curing treatment may be performed by one or more of combinations of light irradiation and a warming treatment.

The warming condition may be at a temperature of, for example, preferably 40° C. or higher, more preferably 50° C. or higher, and preferably 200° C. or lower, more preferably 140° C. or lower, and for a time period of preferably 1 second or longer, more preferably 5 seconds or longer, and also preferably 3 minutes or shorter, more preferably 120 seconds or shorter.

The light used for light irradiation includes not only visible light but also ultraviolet light and other electromagnetic waves. The light irradiation may be performed by, e.g., irradiating light with a wavelength of 200 nm to 500 nm for 0.01 second to 3 minutes.

By alternately repeating the weak UV irradiation at 0.01 $mJ/cm^2$ to 50 $mJ/cm^2$ and the heating a plurality of times, it is possible to obtain a circularly polarized light separating function with a wide reflection bandwidth caused by continuous alteration in a large degree of the pitches of the helical structures. After performing the broadening of the reflection bandwidth by the above-mentioned weak ultraviolet ray irradiation or the like, subsequent complete polymerization of the liquid crystal compound by irradiating the cholesteric resin layer with relatively strong ultraviolet rays such as at 50 $mJ/cm^2$ to 10,000 $mJ/cm^2$ may be performed to thereby obtain the cholesteric resin layer. The broadening of the reflection bandwidth and the irradiation of strong ultraviolet rays described above may be performed in atmospheric air. Alternatively, some or all of the processes thereof may be performed in an atmosphere in which the oxygen concentration is controlled (e.g., under a nitrogen atmosphere).

The number of execution of the process of application of the cholesteric liquid crystal composition onto another layer such as an orientation film and subsequent curing of the composition is not limited to one time, and the application and curing may be repeated a plurality of times to form two or more cholesteric resin layers. However, when a cholesteric liquid crystal composition such as the cholesteric liquid crystal composition (X) is used, it is possible to easily form a cholesteric resin layer that contains a well-oriented polymerizable liquid crystal compound with a Δn of 0.18 or more and that has a thickness as thick as 5 μm or more even by only one applying and curing the cholesteric liquid crystal composition only one time.

The cholesteric resin layer together with the supporting body and the orientation film thus obtained as it is may be used as the first layer. If necessary, the supporting body or the like may be peeled off, and only the cholesteric resin layer may be transferred to be used as the first layer.

(1.3. Second Layer)

The second layer is a phase difference layer. The phase difference layer is a layer that is capable of changing the polarization state of the light that is incident to the layer. The phase difference layer may have uniaxial or biaxial properties. Examples of the phase difference layer may include a so-called positive A plate having characteristics of $nx>ny\approx nz$; a so-called negative A plate having characteristics of $nz\approx nx>ny$; a so-called positive C plate having characteristics of $nz>nx\approx ny$; a so-called negative C plate having characteristics of $nx\approx ny>nz$; a so-called positive B plate having characteristics of $nz>nx>ny$; a so-called negative B plate having characteristics of $nx>ny>nz$; and a so-called Z plate having characteristics of $nx>nz>ny$.

Among these, a positive A plate or a negative A plate is preferable because it is easily produced and easily develops a phase difference within its plane.

Examples of the phase difference layer may include a stretched film obtained by subjecting a resin film formed of a thermoplastic resin to a stretching treatment, and a liquid crystal cured film obtained by causing orientation of a liquid crystal composition containing a polymerizable liquid crystal compound in a predetermined direction and then curing the liquid crystal composition while holding the oriented state.

As the material of the stretched film, any of a material having a positive intrinsic birefringence; a material having a negative intrinsic birefringence; and a material obtained by combining a material having a positive intrinsic birefringence and a material having a negative intrinsic birefringence at any ratio may be used, and the material may be appropriately selected in accordance with the desired characteristics of the phase difference layer.

Specific examples of the material for forming the stretched film may include a polyolefin resin such as a polyethylene resin and a polypropylene resin; a resin containing a polymer containing an alicyclic structure such as a norbornene-based resin; a vinyl aromatic compound polymer resin such as a polystyrene; a cellulose-based resin such as a triacetyl cellulose resin; a polyimide resin; a polyamide-imide resin; a polyamide resin; a polyetherimide resin; a polyether ether ketone resin; a polyether ketone resin; a polyketone sulfide resin; a polyether sulfone resin; a polysulfone resin; a polyphenylene sulfide resin; a polyphenylene oxide resin; a polyethylene terephthalate resin; a polybutylene terephthalate resin; a polyethylene naphthalate resin; a polyacetal resin; a polycarbonate resin; a polyarylate resin; a (meth)acrylic resin; a polyvinyl alcohol resin; a (meth)acrylic ester-vinyl aromatic compound copolymer resin; an isobutene/N-methylmaleimide copolymer resin; a styrene/acrylonitrile copolymer resin; and combinations of these resins.

As the resin for forming the stretched film, a resin containing a polymer containing an alicyclic structure is preferable. Hereinafter, the polymer containing an alicyclic structure may be referred to as an "alicyclic structure-containing polymer" as appropriate. The alicyclic structure-containing polymer is a polymer containing an alicyclic structure in the repeating units. Examples of the alicyclic structure-containing polymer may include a polymer that may be obtained by a polymerization reaction using a cyclic olefin as a monomer; and a hydrogenated product thereof. As the alicyclic structure-containing polymer described above, any of a polymer containing an alicyclic structure in a main chain and a polymer containing an alicyclic structure in a side chain may be used. Among these, it is preferable that the alicyclic structure-containing polymer contains an alicyclic structure in a main chain. Examples of the alicyclic structure may include a cycloalkane structure and a cycloalkene structure, and a cycloalkane structure is preferable from the viewpoint of thermal stability and the like.

Examples of the alicyclic structure-containing polymer may include (1) a norbornene-based polymer, (2) a monocyclic olefin polymer, (3) a cyclic conjugated diene polymer, (4) a vinyl alicyclic hydrocarbon polymer, and (5) a hydrogenated product thereof. Among these, a norbornene-based polymer and a hydrogenated product thereof are more preferable from the viewpoint of transparency and moldability.

Examples of the norbornene-based polymer may include a ring-opening polymer of a norbornene-based monomer, a ring-opening copolymer of a norbornene-based monomer and another monomer copolymerizable therewith, and a hydrogenated product thereof; and an addition polymer of a norbornene-based monomer, and an addition copolymer of a norbornene-based monomer and another monomer copolymerizable therewith. Among these, a hydrogenated product of a ring-opening polymer of a norbornene-based monomer is particularly preferable from the viewpoint of transparency.

As a resin containing an alicyclic structure-containing polymer, various products are commercially available, and therefore, among these, those having desired characteristics may be appropriately selected for use. Examples of such commercially available products may include product groups of the trade names "ZEONOR" (manufactured by ZEON Corporation), "ARTON" (manufactured by JSR Corporation), "APEL" (manufactured by Mitsui Chemicals, Inc.), and "TOPAS" (manufactured by Polyplastics Co., Ltd.).

A stretched film as the phase difference layer may be obtained by forming a resin film with these resins as a material by a method such as a cast molding method, an extrusion molding method, or an inflation molding method, and stretching the resin film.

An in-plane retardation Re of the second layer is preferably 40 nm or more, and more preferably 300 nm or more, and is preferably 1600 nm or less, and more preferably 1250 nm or less.

When the in-plane retardation Re of the second layer is equal to or more than the above-mentioned lower limit value, the second layer gives to the incident light a large phase difference and then allows the light to emit therefrom, so that the difference in color between the light visually recognized when the display medium is observed from the side of the first layer and the light visually recognized when the display medium is observed from the side of the third layer can be made larger.

When the in-plane retardation Re of the second layer is equal to or less than the above-mentioned upper limit value, the reflectance of the display medium for non-polarized light can become a value that does not have the local maximum and local minimum in the visible light range. If the reflection spectrum does not have many local maxima and local minima, the color of the reflected light can be more accurately recognized with the naked eyes. As a result, the difference in color between the light visually recognized when the display medium is observed from the side of the first layer and the light visually recognized when the display medium is observed from the side of the third layer can be more easily identified with the naked eyes.

The in-plane retardations Re of the second layer at wavelengths 400 nm, 560 nm, and 650 nm are represented by Re(400), Re(560), and Re(650), respectively.

The value of Re(400)/Re(560) is preferably 0.8 or more, and more preferably 1.0 or more, and the upper limit value may be, for example, 1.3 or less.

The value of Re(650)/Re(560) is preferably 1.1 or less, and more preferably 1.000 or less, and the lower limit value may be, for example, 0.8 or more.

When the value of Re(400)/Re(560) and/or the value of Re(650)/Re(560) of the second layer fall within the above-mentioned ranges, the second layer can give to lights of different wavelengths phase differences that are greatly different from each other. As a result, the difference in color between the light visually recognized when the display medium is observed from the side of the first layer and the light visually recognized when the display medium is observed from the side of the third layer can be made larger.

(1.4. Function of Display Medium)

Subsequently, the function of the display medium will be described below.

Figure 4:
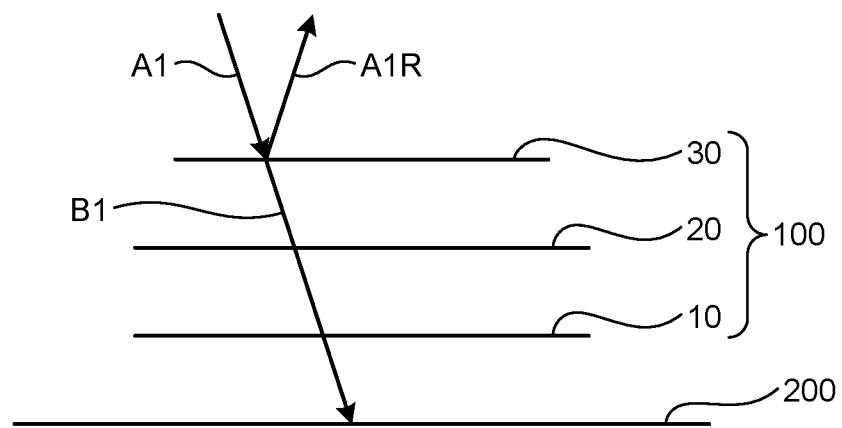
FIG. 4 is a schematic view illustrating a state of reflected light by the display medium in a case where the display medium is irradiated with unpolarized light from a side of a third layer.
Figure 5:
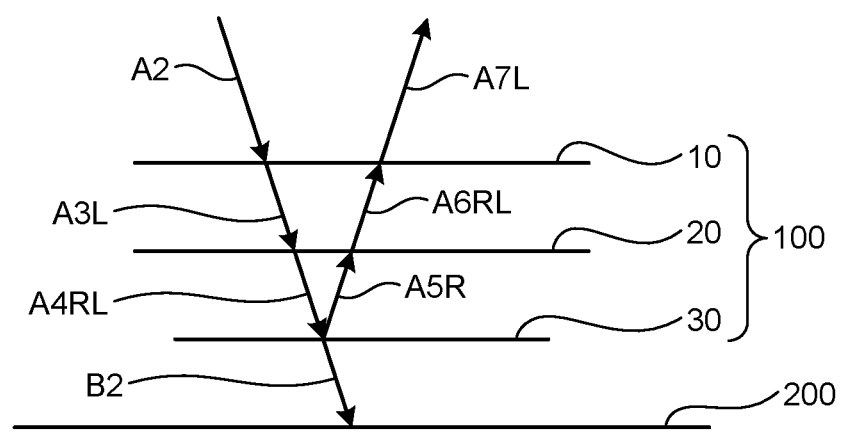
FIG. 5 is a schematic view illustrating a state of reflected light by the display medium in a case where the display medium is irradiated with unpolarized light from a side of a first layer.

FIG. 4 is a schematic view illustrating a state of reflected light by the display medium in a case where the display medium is irradiated with unpolarized light from the side of the third layer. FIG. 5 is a schematic view illustrating a state of reflected light by the display medium in a case where the display medium is irradiated with unpolarized light from the side of the first layer.

As illustrated in FIG. 4, when the display medium 100 is irradiated with unpolarized light A1 from the side of the third layer 30 of the display medium 100, the third layer 30 reflects circularly polarized light A1R having the rotation direction D1, and a color corresponding to a selected reflection bandwidth of the third layer 30 is visually recognized. The third layer 30 allows to pass therethrough circularly polarized light B1 having the rotation direction D2, and the circularly polarized light B1 passes through the second layer 20 and the first layer 10 and is absorbed in an absorption layer 200.

As illustrated in FIG. 5, when the display medium 100 is irradiated with unpolarized light A2 from the side of the first layer 10 of the display medium 100, the first layer 10 allows circularly polarized light A3L having the rotation direction D2 to pass therethrough.

To the circularly polarized light A3L, a phase difference is given by the second layer 20 serving as a phase difference layer, and thereby the polarization state of the circularly polarized light A3L changes. As a result, the second layer 20 allows to pass therethrough circularly polarized light A4RL, which includes circularly polarized light having the rotation direction D1 and circularly polarized light having the rotation direction D2.

The third layer 30 reflects, among circularly polarized light A4RL, circularly polarized light A5R having the rotation direction D1 and allows to pass therethrough circularly polarized light B2 having the rotation direction D2. The circularly polarized light B2 is absorbed by the absorption layer 200. Usually, in the circularly polarized light A4RL, the ratio of the circularly polarized light having the rotation direction D1 and the circularly polarized light having the rotation direction D2 differs depending on the wavelength, and the intensity of the circularly polarized light A5R thus differs depending on the wavelength.

The circularly polarized light A5R is incident on the second layer 20, and thereto a phase difference is given, whereby the polarization state of the circularly polarized light A5R changes. As a result, the second layer 20 allows to pass therethrough circularly polarized light A6RL, which includes circularly polarized light having the rotation direction D1 and circularly polarized light having the rotation direction D2.

The first layer 10 allows to pass therethrough, among circularly polarized light A6RL, circularly polarized light A7L having the rotation direction D2. Usually, in the circularly polarized light A6RL, the ratio of the circularly polarized light having the rotation direction D1 and the circularly polarized light having the rotation direction D2 differs depending on the wavelength, and the intensity of the circularly polarized light A7L thus differs depending on the wavelength. Therefore, the color of the circularly polarized light A7L differs from that of the circularly polarized light A1R, which does not pass through the second layer 20.

In this manner, the color of the reflected light A1R from the display medium 100, which is the consequence of irradiation of the display medium 100 with the unpolarized light from the side of the third layer 30, differs from the color of the reflected light A7L from the display medium 100, which is the consequence of irradiation of the display medium 100 with the unpolarized light A2 from the side of the first layer 10.

In a case where the first layer 10 is a layer having cholesteric regularity, and where the third layer 30 is a layer containing resin flakes having cholesteric regularity, the display medium further acquires the function described below.

When the display medium 100 is irradiated with the unpolarized light A1 from the side of the third layer 30, the third layer 30 causes diffuse reflection of, among the unpolarized light A1, circularly polarized light having the rotation direction D1. Thus the circularly polarized light A1R reflected by the third layer 30 is visually recognized as diffused light. When the display medium 100 is irradiated with the unpolarized light A2 from the side of the first layer 10, the circularly polarized light A7L that has emitted from the first layer 10 is visually recognized as diffused light. The diffused light is easily distinguished from specular reflected light. Reflected light from an area of the display medium 100, in which the third layer 30 is not stacked in a thickness direction, is specular reflected light. Accordingly, the shape of the third layer 30 can be recognized more easily both in the case where the shape of the third layer 30 is observed under irradiation with unpolarized light from the side of the third layer 30 and in the case where the shape of the third layer 30 is observed under irradiation with unpolarized light from the side of the first layer 10.

(1.5. Application of Display Medium)

According to the functions achieved by the display medium, the display medium displays colors that are different on the front side and the back side. Consequently, the display medium functions as an identification medium for determining authenticity, and whether or not the display medium is authentic can be determined. The method for determining authenticity will further be described later.

In addition, the display medium can preferably be used as a card such as a name card, a printed matter to be displayed, an ornament, or the like, taking advantage of the function of being able to display different colors on the front side and the back side.

(2. Method for Determining Authenticity of Display Medium)

On the basis of the functions achieved by the display medium, authenticity of the display medium may be determined by the following method.

The method for determining authenticity of a display medium according to an embodiment of the present invention includes:

a step (1) of confirming that a display medium is semi-transparent;

a step (2) of irradiating the display medium with unpolarized light from a side of the third layer, observing from the side of the third layer light reflected by the display medium, and acquiring color information C3 of the third layer;

a step (3) of irradiating the display medium with unpolarized light from a side of the first layer, observing from the side of the first layer light reflected by the display medium, and acquiring color information C1 of the first layer; and a step (4) of comparing the color information C3 with the color information C1 to determine if the color information C3 and the color information C1 are not the same.

The step (1) may be performed before or after the steps (2) to (4).

The step (3) may be performed after the step (2), and the step (2) may be performed after the step (3).

The step (4) is usually performed after the step (2) and the step (3).

(2.1. Step (1))

In the step (1), it is confirmed that the display medium is semi-transparent. Herein, being semi-transparent means that the display medium has a transmittance of 30% or more upon incident of unpolarized light on the display medium. If the display medium is not semi-transparent, it is determined that the display medium is a medium made of a material that does not have a circularly polarized light separation function, and that the display medium is therefore not authentic.

(2.2. Step (2))

In the step (2), the display medium is irradiated with unpolarized light from a side of the third layer, and the light reflected by the display medium is observed from the side of the third layer, to thereby acquire color information C3 of the third layer. Examples of the color information C3 may include lightness, hue, and chroma. The color information C3 may be acquired qualitatively with the naked eye or quantitatively with a colorimeter or the like.

In order to observe only light reflected by the display medium, the step (2) is usually performed while the display medium is put on an object having a high light absorbance. An example of an object having a high absorbance of light may be a black sheet of paper.

(2.3. Step (3))

In the step (3), the display medium is irradiated with unpolarized light from a side of the first layer, and the light reflected by the display medium is observed from the side of the first layer, to thereby acquire color information C1 of the first layer. Examples of the color information C1 may include the same types of information as those mentioned as examples for the color information C3. Similar to the color information C3, the color information C1 may be acquired qualitatively with the naked eye or quantitatively with a colorimeter or the like.

In order to observe only reflected light by the display medium, the step (3) is usually performed while the display medium is put on an object having a high light absorbance.

In the step (3), the color information C1 of the first layer refers to the color information in an area in which the first layer is stacked with the second layer and the third layer in the thickness direction.

(2.4. Step (4))

In the step (4), the color information C3 and the color information C1 are compared to determine if the color information C3 and the color information C1 are not the same. In a case where it is confirmed in the step (1) that the display medium is semi-transparent, and where it is determined in the step (4) that the color information C3 and the color information C1 are not the same, it can be determined that the display medium is authentic.

The color information C3 and the color information C1 may be a value a* and a value b* in the CIE 1976 L*a*b* color space, for example. In this case, determination that the color information C3 and the color information C1 are not equal can be performed by determining whether or not a distance (a difference $\Delta_{(1-3)}$) between the coordinates of the color observed from the side of the first layer ($a^*_1$, $b^*_1$) and coordinates of the color observed from the side of the third layer ($a^*_3$, $b^*_3$) is a predetermined value or higher, for example. Specifically, it can be determined that the color information C3 and the color information C1 are not the same in a case where the difference $\Delta_{(1-3)}$ is preferably 20 or higher, and more preferably 40 or higher.

From a viewpoint of performing determination of authenticity of the display medium without the need for a special viewer, the determination is preferably performed by comparing the qualitative color information C3 acquired with the naked eye with the qualitative color information C1 acquired with the naked eye.

(3. Article Including Display Medium)

The display medium may be attached to a target object in an optional form such as a certification and a tag to constitute an article including the display medium. Examples of the target object to which the display medium is attached may include a target object the authenticity of which is to be determined.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, unless otherwise specified.

(Measurement of Average Particle Diameter)

The average particle diameter of the resin flakes was measured by the following method.

First, using several sieves having different sizes of openings, measurement of the proportion of the resin flakes passing through each of the sieves having the sizes of openings was performed. Then, on the basis of the size of openings and the proportion of the resin flakes that pass through the sieve having the size of openings, the particle diameter distribution of the resin flakes was expressed in total weight percentage. The particle diameter in which the integrated weight value was 50% in the particle diameter distribution was adopted as the average particle diameter.

(Chromaticity)

For the identification medium as the display medium, the difference $\Delta_{(1-3)}$ between chromaticity of reflected light at the part of the first layer being stacked with the third layer in the thickness direction (that is, the part with a character pattern "GENUINE") observed from the side of the first layer and chromaticity of reflected light at the third layer (that is, the part with the character pattern "GENUINE") observed from the side of the third layer was calculated by the following method.

First, with a spectrophotometer ("UV-VIS550" manufactured by JASCO Corporation), in a wavelength range of 400 nm to 780 nm, reflectance 1 at the part of the character pattern "GENUINE" was measured from the side of the first layer, and reflectance 3 at the part of the character pattern "GENUINE" was measured from the side of the third layer.

With a color calculation software that is equipment of the spectrophotometer, a light source D65 was set as a light source of reflected light, and a value a* and a value b* of the reflected light in the CIE 1976 L*a*b* color space were calculated on the basis of each of the reflectance 1 and the reflectance 3.

A value a* and a value b* of the reflected light at the part of the first layer being stacked with the third layer in the thickness direction (the part with the character pattern "GENUINE") were calculated on the basis of the reflectance 1 observed from the side of the first layer, and the value a* and the value b* obtained were adopted as $a^*_1$ and $b^*_1$, respectively.

Similarly, a value a* and a value b* of the reflected light at the third layer (the part with the character pattern "GENUINE") were calculated on the basis of the reflectance 3 observed from the side of the third layer, and the value a* and the value b* obtained were adopted as $a^*_3$ and $b^*_3$, respectively.

From $a^*_1$, $b^*_1$, $a^*_3$, and $b^*_3$ obtained, the difference $\Delta_{(1-3)}$ was derived on the basis of the following equation.

$$\Delta_{(1-3)} = \sqrt{\{(a^*_1 - a^*_3)^2 + (b^*_1 - b^*_3)^2\}}$$

(Thickness of Layer)

The thickness of the layer was measured with a digital micrometer (manufactured by Mitsutoyo Corporation).

(In-Plane Retardation Re)

For the phase difference layer as the second layer, in-plane retardations Re at the wavelengths 400 nm, 560 nm, and 650 nm were measured with a phase difference meter ("Axoscan" manufactured by Axometrics, Inc).

From the in-plane retardations Re thus measured, a value of Re(400)/Re(560) and a value of Re(650)/Re(560) were calculated.

Herein, the values for the in-plane retardations Re at wavelengths 400 nm, 560 nm, and 650 nm are represented by Re(400), Re(560), and Re(650), respectively.

(Production Example A1) Production of Layer Having Cholesteric Regularity (Preparation of Liquid Crystal Composition L1)

Respective components were mixed according to the ratio shown in the table below to prepare a photocurable liquid crystal composition L1.

Table 1: Ratio of Liquid Crystal Composition L1

TABLE 1

| ratio of liquid crystal composition L1 | |
|---|---|
| Photopolymerizable liquid crystal compound 1 (parts) | 21.9 |
| Photopolymerizable non-liquid crystal compound (parts) | 5.47 |
| Chiral agent (parts) | 1.69 |
| Photoinitiator (parts) | 0.9 |
| Surfactant (parts) | 0.03 |
| Cyclopentanone (parts) | 70 |

The components used in the preparation of the liquid crystal composition L1 are as follows.

The photopolymerizable liquid crystal compound 1 is a compound having a structure represented by the following formula (B5).

(Chemcial formula 3)

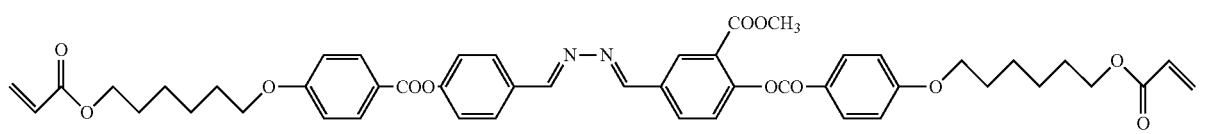

(B5)

The photopolymerizable non-liquid crystal compound is a compound having a structure represented by the following formula (A10).

(Chemical formula 4)

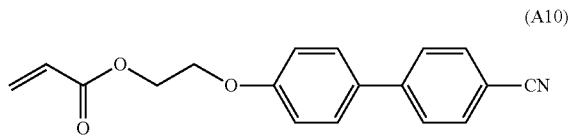

(A10)

As a chiral agent, "LC756" manufactured by BASF was used.

As the photoinitiator, "Irgacure OXE02" manufactured by Ciba Japan Co., Ltd. was used.

As the surfactant, "Ftergent 209F" manufactured by Neos Co., Ltd. was used.

(Production of Long-Length Multilayered Film)

As a substrate film, a long-length polyethylene terephthalate (PET) film which is isotropic in terms of in-plane refractive index ("PET film A4100" having a thickness of 100 μm manufactured by Toyobo Co., Ltd.) was prepared. The substrate film was attached to a feed-out unit of a film conveyance device, and the following operation was performed while the substrate film was conveyed in a long-length direction. First, a rubbing treatment was performed in the long-length direction parallel to the conveyance direction. Subsequently, the prepared liquid crystal composition L1 was applied onto the surface having been subjected to the rubbing treatment using a die coater. As a result, an uncured liquid crystal composition film was formed on one surface of the substrate film.

Subsequently, the uncured liquid crystal composition film was subjected to an orientation treatment while being heated at 120° C. for 4 minutes and was then irradiated with ultraviolet rays at 800 mJ/cm² in a nitrogen atmosphere to completely cure the liquid crystal composition film. As a result, a multilayered film in which a layer having cholesteric regularity (a cholesteric resin layer) with a thickness shown in Table 2 was provided on one surface of a long-length PET film was obtained.

The liquid crystal composition L1 containing the chiral agent is cured while holding cholesteric regularity under the conditions shown in Table 2 to cause a layer having cholesteric regularity to be obtained.

TABLE 2

| Orientation treatment | Temperature (° C.) | 120 |
| | Time (minutes) | 4 |
| Ultraviolet ray irradiation treatment (mJ/cm²) | | 800 |
| Thickness (μm) | | 5.2 |

(Measurement of Reflectance of Layer Having Cholesteric Regularity)

The PET film was peeled off from the obtained multilayered film including the cholesteric resin layer, and the cholesteric resin layer was obtained as a single-layered film. Unpolarized light (wavelength: 400 nm to 780 nm) was incident on the obtained cholesteric resin layer, and the reflectance was measured with an ultraviolet-visible spectrophotometer (UV-Vis 550 manufactured by JASCO Corporation).

Figure 6:
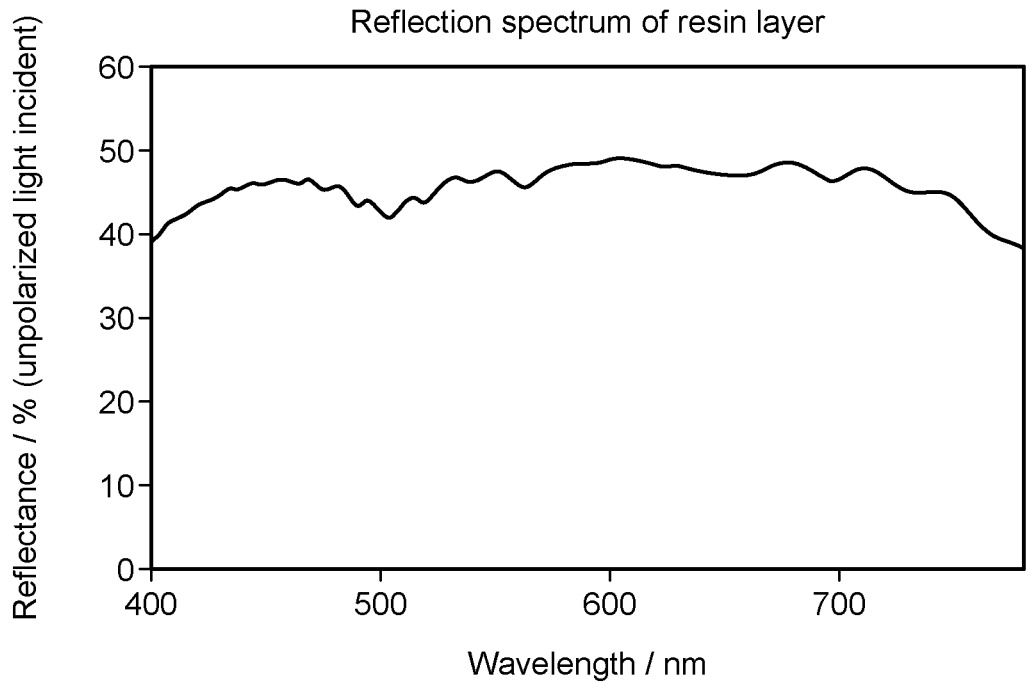
FIG. 6 is a graph showing a measurement result of reflectance of a cholesteric resin layer in a wavelength range of 400 nm to 780 nm.

FIG. 6 is a graph showing a measurement result of reflectance of the cholesteric resin layer in a wavelength range of 400 nm to 780 nm. As shown in FIG. 6, it is understood that the reflectance of the cholesteric resin layer is 35% or more and 50% or less in a wavelength range of 420 nm or more and 650 nm or less.

(Production Example B1) Production of Paint Containing Resin Flakes Having Cholesteric Regularity (Production of Resin Flakes)

Resin flakes having cholesteric regularity were produced by using the multilayered film obtained in the Production Example A1.

Figure 7:
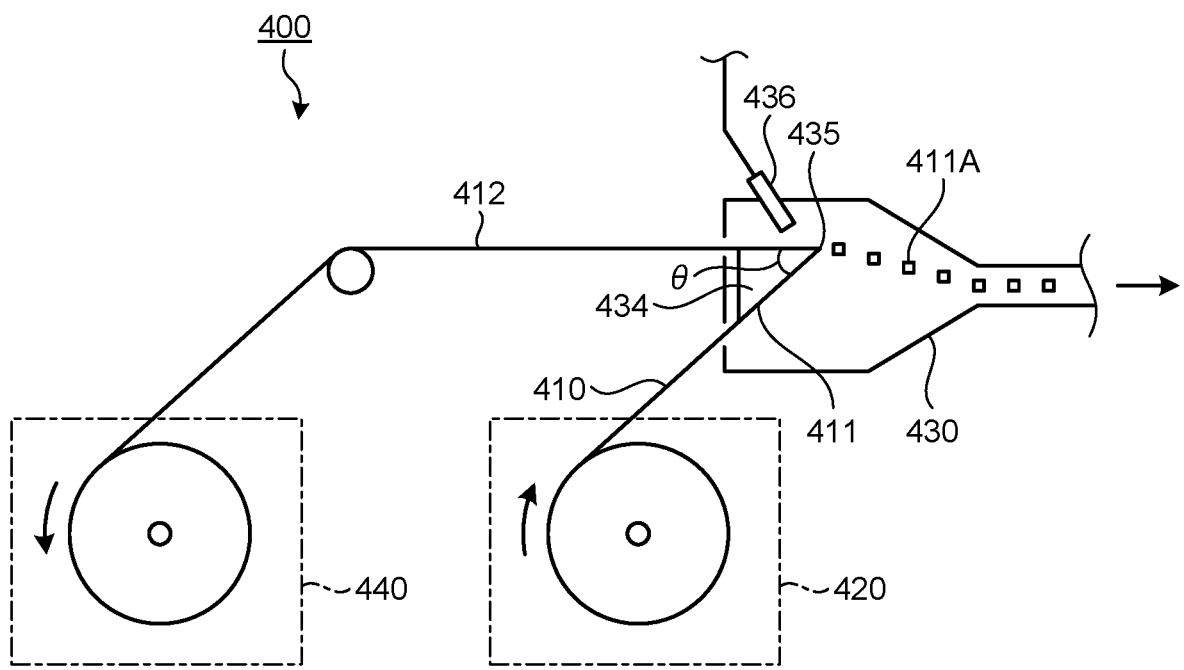
FIG. 7 is a side view schematically illustrating a device for producing resin flakes.

As the device for producing the resin flakes, the device illustrated in FIG. 7 was used. FIG. 7 is a side view schematically illustrating the device for producing the resin flakes.

As illustrated in FIG. 7, a producing device 400 including a film feed-out unit 420, a peeling unit 430, and a film collecting unit 440 was prepared. The peeling unit 430 included a bar 434 that had a corner portion 435 taking the form of an acute angle and a nozzle 436 that was provided on the immediate downstream side of the corner portion 435 and that was capable of blowing air. In this configuration, the angle of the corner portion 435 of the bar 434 was set so as to be able to fold back the multilayered film 410 at an angle θ (45°). The corner portion had a chamfered structure with R=0.2 mm to 0.3 mm.

The multilayered film 410 was attached to the film feed-out unit 420 in a direction in which the multilayered film 410 was able to be folded back at the corner portion 435 of the bar 434 with the cholesteric resin layer 411 facing outward of the PET film 412 serving as a supporting body. Subsequently, the multilayered film 410 was fed from the film feed-out unit 420 while a tensile force is applied to the multilayered film 410 in a conveyance direction by the film collecting unit 440. In this operation, the tensile force to be applied to the multilayered film 410 was set to 80 N/m. Also, air was blown from the nozzle 436 at a pressure of 0.5 MPa.

The multilayered film 410 was folded back at the corner portion 435 of the bar 434, and many cracks were formed. After that, the cholesteric resin layer 411, in which the cracks were formed, was peeled and blown away by the air blown from the nozzle 436, and peeled-off pieces 411A were obtained. The obtained peeled-off pieces 411A were collected by a collector.

The collected peeled-off pieces of the cholesteric resin layer were ground with a stone grinder ("Micro Powder MPW-G008 manufactured by West Co., Ltd.) to obtain resin flakes. The average particle diameter of the obtained resin flakes was 50 μm.

It is regarded that the reflectance of the resin flakes for unpolarized light is the same value as that for the measured reflectance of the cholesteric resin layer that is the raw material for the resin flakes. Accordingly, the reflectance of the resin flakes for unpolarized light is 35% or more and 50% or less in a wavelength range of 420 nm or more and 650 nm or less as shown in FIG. 6.

(Production of Paint)

Using the obtained resin flakes as a pigment, a paint was produced by the following method.

100 Parts by weight of a screen ink ("No. 2500 MEDIUM" manufactured by Jujo Chemical Co., Ltd.) as a binder solution, 10 parts by weight of a dedicated diluent for the screen ink (Tetron standard solvent), and 15 parts by weight of the aforementioned flakes were mixed to produce a paint 1.

Production Example B2

A paint 2 was produced by the same manner as that of Production Example B1 (Production of paint) except that the following matter was changed.
Metal aluminum flakes ("Silver pigment 606H" manufactured by Seiko Advance Ltd.) were used instead of the resin flakes.

Production Example B3

A pigment containing metal aluminum ("Half Mirror Z Silver R1" manufactured by Seiko Advance Ltd.) was diluted with a solvent ("T-477" manufactured by Seiko Advance Ltd.) to produce a paint 3. The dilution rate was appropriately adjusted so that a semi-transparent aluminum layer having a total light transmittance of 50% was obtained from the paint 3.

(Production Example C1) Production of Phase Difference Layer

Pellets of a cycloolefin resin ("ZEONOR 1215" manufactured by ZEON Corporation) were prepared. The pellets were fed to a single-screw extruder (manufactured by OCS Optical Control Systems GmbH) and subjected to extrusion molding to obtain an extruded film with a thickness of 200 μm.

The obtained extruded film (length 150 mm×width 50 mm) was stretched in the length direction by using a tensile tester with a constant temperature bath (manufactured by Instron), to obtain a phase difference layer 1 having an in-plane retardation Re shown in Table 3. The stretching temperature was 125° C., the distance between the chucks of the tensile tester was 50 mm, and the stretching speed was 100 mm/min. The stretching ratio was as shown in Table 3.

Production Examples C2 to C22

Phase difference layers 2 to 22 were obtained by the same manner as that of Production Example C1 except that the stretching ratio was changed as shown in Table 3.

Table 3 shows the stretching ratios, in-plane retardations Re, layer thicknesses, birefringences Δn, values of Re(400)/Re(560), and values of Re(650)/Re(560) of the phase difference layers 1 to 22.

TABLE 3

| | Stretching ratio (times) | Re (560) (nm) | Layer thickness (μm) | Δn | Re(400)/Re(560) | Re(650)/Re(560) |
|---|---|---|---|---|---|---|
| Phase difference layer 1 | 1.1 | 44 | 181 | 0.0002 | 1.02 | 0.99 |
| Phase difference layer 2 | 1.15 | 70 | 170 | 0.0004 | 1.02 | 0.99 |
| Phase difference layer 3 | 1.2 | 88 | 165 | 0.0005 | 1.02 | 0.99 |
| Phase difference layer 4 | 1.25 | 131 | 160 | 0.0008 | 1.02 | 0.99 |
| Phase difference layer 5 | 1.3 | 175 | 152 | 0.0012 | 1.02 | 0.99 |
| Phase difference layer 6 | 1.35 | 219 | 147 | 0.0015 | 1.02 | 0.99 |
| Phase difference layer 7 | 1.4 | 263 | 142 | 0.0018 | 1.02 | 0.99 |
| Phase difference layer 8 | 1.45 | 306 | 136 | 0.0023 | 1.02 | 0.99 |
| Phase difference layer 9 | 1.5 | 350 | 132 | 0.0027 | 1.02 | 0.99 |
| Phase difference layer 10 | 1.6 | 394 | 126 | 0.0031 | 1.02 | 0.99 |
| Phase difference layer 11 | 1.7 | 438 | 116 | 0.0038 | 1.02 | 0.99 |
| Phase difference layer 12 | 1.8 | 481 | 110 | 0.0044 | 1.02 | 0.99 |
| Phase difference layer 13 | 1.9 | 525 | 104 | 0.0051 | 1.02 | 0.99 |
| Phase difference layer 14 | 2 | 613 | 98 | 0.0063 | 1.02 | 0.99 |
| Phase difference layer 15 | 2.1 | 700 | 94 | 0.0074 | 1.02 | 0.99 |

TABLE 3-continued

| | Stretching ratio (times) | Re (560) (nm) | Layer thickness (μm) | Δn | Re(400)/ Re(560) | Re(650)/ Re(560) |
|---|---|---|---|---|---|---|
| Phase difference layer 16 | 2.2 | 788 | 89 | 0.0089 | 1.02 | 0.99 |
| Phase difference layer 17 | 2.3 | 875 | 87 | 0.0101 | 1.02 | 0.99 |
| Phase difference layer 18 | 2.4 | 963 | 83 | 0.0116 | 1.02 | 0.99 |
| Phase difference layer 19 | 2.5 | 1050 | 78 | 0.0135 | 1.02 | 0.99 |
| Phase difference layer 20 | 2.6 | 1225 | 75 | 0.0163 | 1.02 | 0.99 |
| Phase difference layer 21 | 2.8 | 1401 | 70 | 0.0200 | 1.02 | 0.99 |
| Phase difference layer 22 | 3 | 1576 | 65 | 0.0242 | 1.02 | 0.99 |

Example 1

(1-1. Production of Multilayered Body)

The cholesteric resin layer that the multilayered film obtained in Production Example A1 had was attached to the phase difference layer 1 with a sheet-shape tackiness agent. As the tackiness agent, "transparent tackiness tape LUCIACS CS9621T" (thickness: 25 μm, visible light transmittance: 90% or more, in-plane retardation Re: 3 nm or less) manufactured by Nitto Denko Corporation was used. Subsequently, the PET film was peeled off from the multilayered film attached to the phase difference layer to obtain a multilayered body 1 having a layer structure of (cholesteric resin layer)/(tackiness agent layer)/(phase difference layer).

(1-2. Production of Identification Medium as Display Medium)

On the phase difference layer of the obtained multilayered body 1, screen printing was performed using the paint 1. As the screen printing plate, a plate of 100 mesh per inch capable of printing the character pattern "GENUINE" was used. Subsequently, the multilayered body 1 was placed on a hot plate set at 40° C. and was heated for 10 minutes to dry the paint. As a result, an identification medium 1 as the display medium, which included a portion in which (cholesteric resin layer)/(tackiness agent layer)/(phase difference layer)/(layer of the dried paint 1) were stacked in the thickness direction in this order, was obtained. In the present identification medium, the "cholesteric resin layer" corresponds to the first layer, the "phase difference layer" corresponds to the second layer, and the "layer of the dried paint 1" corresponds to the third layer. The paint 1 contains the resin flakes produced from the cholesteric resin layer. The resin flakes are capable of reflecting circularly polarized light having the same rotation direction as that of circularly polarized light that the cholesteric resin layer is capable of reflecting. The resin flakes also allow to pass therethrough circularly polarized light having the same rotation direction as that of circularly polarized light that the cholesteric resin layer allows to pass therethrough. Accordingly, the layer of the dried paint 1 is capable of reflecting circularly polarized light having the same rotation direction as that of circularly polarized light that the cholesteric resin layer is capable of reflecting and also allows to pass therethrough circularly polarized light having the same rotation direction as that of circularly polarized light that the cholesteric resin layer allows to pass therethrough.

Examples 2 to 22

Identification media 2 to 22 were obtained by the same manner as that of Example 1 except that the following matters were changed.
In (1-1. Production of multilayered body), multilayered bodies 2 to 22 were obtained using the phase difference layers 2 to 22 obtained in the production examples C2 to C22 instead of the phase difference layer 1.
In (1-2. Production of identification medium as display medium), identification media 2 to 22 were obtained using the multilayered bodies 2 to 22 instead of the multilayered body 1.

The identification media 2 to 22 each included a portion in which (cholesteric resin layer)/(tackiness agent layer)/(phase difference layer)/(layer of the dried paint 1) were stacked in the thickness direction in this order. In the identification media 2 to 22, the "cholesteric resin layer" corresponds to the first layer, the "phase difference layer" corresponds to the second layer, and the "layer of the dried paint 1" corresponds to the third layer.

Comparative Examples 1 to 3

Identification media C1 to C3 were obtained by the same manner as that of Example 1 except that the following matters were changed.
In (1-1. Production of multilayered body), multilayered bodies C1 to C3 were obtained using the phase difference layers 4, 13, and 21 obtained in the production examples C4, C13, and C21 instead of the phase difference layer 1, respectively.
In (1-2. Production of identification medium as display medium), identification media C1 to C3 were obtained using the multilayered bodies C1 to C3 instead of the multilayered body 1 and using the paint 2 produced in the production example B2 instead of the paint 1.

The identification media C1 to C3 each included a portion in which (cholesteric resin layer)/(tackiness agent layer)/(phase difference layer)/(layer of the dried paint 2) were stacked in the thickness direction in this order.

Comparative Example 4

(C4-1. Production of Multilayered Body)

Screen printing was performed using the paint 3 on one surface of the phase difference layer 4 that had been obtained in Production Example C4. As the screen printing plate, a plate of 100 mesh per inch was used. Subsequently, the phase difference layer 4 was placed on a hot plate set at 40° C. and was heated for 10 minutes to dry the paint. As a result, a semi-transparent aluminum layer having a total light transmittance of 50% was formed on the one surface of the phase difference layer 4, to obtain a multilayered body C4 having a structure of (layer of the dried paint 3 (aluminum layer))/(phase difference layer).

(C4-2. Production of Identification Medium as Display Medium)

An identification medium C4 was obtained by the same manner as that of Example 1 (1-2. Production of identification medium as display medium) except that the multilayered body C4 was used instead of the multilayered body 1. The identification medium C4 included a portion in which (aluminum layer)/(phase difference layer)/(layer of the dried paint 1) were stacked in the thickness direction in this order.

Comparative Examples 5 and 6

Identification media C5 and C6 as display media were obtained by the same manner as that of Comparative Example 4 except that the following matters were changed.
In (C4-1. Production of multilayered body), a multilayered body C5 or C6 was obtained using the phase difference layer 13 or 21 instead of the phase difference layer 4.
In (C4-2. Production of identification medium as display medium), the identification medium C5 or C6 was obtained using the multilayered body C5 or C6 instead of the multilayered body C4.

Comparative Example 7

Screen printing was performed using the paint 2 on the phase difference layer of the multilayered body C4 obtained in Comparative Example 4 (C4-1. Production of multilayered body). As the screen printing plate, a plate of 100 mesh per inch capable of printing the character pattern "GENUINE" was used. Subsequently, the multilayered body C4 was placed on a hot plate set at 40° C. and was heated for 10 minutes to dry the paint. As a result, an identification medium C7 as a display medium was obtained, which included a portion in which (aluminum layer)/(phase difference layer)/(layer of the dried paint 2) were stacked in the thickness direction in this order.

Comparative Examples 8 and 9

Identification media C8 and C9 as display media were obtained by the same manner as that of Comparative Example 7 except that the following matters were changed.

The identification medium C8 or C9 was obtained using the multilayered body C5 or C6 obtained in Comparative Example 5 or 6 instead of the multilayered body C4.

Reference Example R1

The PET film was peeled off from the multilayered film obtained in Production Example A1 to obtain a cholesteric resin layer as a single-layer film. Screen printing was performed using the paint 1 on one surface of the obtained cholesteric resin layer. As the screen printing plate, a plate of 100 mesh per inch capable of printing the character pattern "GENUINE" was used. Subsequently, the cholesteric resin layer was placed on a hot plate set at 40° C. and was heated for 10 minutes to dry the paint. As a result, an identification medium R1 as a display medium was obtained, which included a portion in which (cholesteric resin layer)/(layer of the dried paint 1) were stacked in the thickness direction in this order.

The table below shows the layer structure and evaluation results of Examples, Comparative Examples, and Reference Examples.

In the table below, the abbreviations have the following meanings:

CLC sheet: cholesteric resin layer

CLC flake: layer of the paint 1 containing resin flakes produced from a cholesteric resin layer Al flake: layer of the paint 2 containing metal aluminum flakes Al sheet: semi-transparent aluminum layer formed from the paint 3

TABLE 4

| | First layer | Second layer Re (560) (nm) | Third layer | a*1 | b*1 | a*3 | b*3 | Δ (1-3) |
|---|---|---|---|---|---|---|---|---|
| Ref. Ex. R1 | CLC sheet | 0 | CLC flake | 3.5 | 2.5 | 3.4 | 4.3 | 1.8 |
| Ex. 1 | CLC sheet | 44 | CLC flake | 8.1 | −19.0 | 3.3 | 3.2 | 22.7 |
| Ex. 2 | CLC sheet | 70 | CLC flake | 7.1 | −23.2 | 3.4 | 4.2 | 27.6 |
| Ex. 3 | CLC sheet | 88 | CLC flake | 7.8 | −28.7 | 3.1 | 4.5 | 33.5 |
| Ex. 4 | CLC sheet | 131 | CLC flake | 4.9 | −35.5 | 2.9 | 4.1 | 39.6 |
| Ex. 5 | CLC sheet | 175 | CLC flake | −4.5 | −28.5 | 4.1 | 3.9 | 33.5 |
| Ex. 6 | CLC sheet | 219 | CLC flake | −14.9 | −17.0 | 3.3 | 2.9 | 26.9 |
| Ex. 7 | CLC sheet | 263 | CLC flake | −18.3 | 24.7 | 2.8 | 3.7 | 29.7 |
| Ex. 8 | CLC sheet | 306 | CLC flake | −9.8 | 57.7 | 2.8 | 3.5 | 55.7 |
| Ex. 9 | CLC sheet | 350 | CLC flake | 7.4 | 81.2 | 4.1 | 3.7 | 77.6 |
| Ex. 10 | CLC sheet | 394 | CLC flake | 25.9 | 78.7 | 3.5 | 3.1 | 78.8 |
| Ex. 11 | CLC sheet | 438 | CLC flake | 42.6 | 27.8 | 3.2 | 3.5 | 46.3 |
| Ex. 12 | CLC sheet | 481 | CLC flake | 63.2 | −30.1 | 3.7 | 2.7 | 67.9 |
| Ex. 13 | CLC sheet | 525 | CLC flake | 74.0 | −62.2 | 2.9 | 4.8 | 97.7 |
| Ex. 14 | CLC sheet | 613 | CLC flake | 17.1 | −64.8 | 2.8 | 2.9 | 69.2 |
| Ex. 15 | CLC sheet | 700 | CLC flake | −47.6 | −27.6 | 3.1 | 3.1 | 59.3 |
| Ex. 16 | CLC sheet | 788 | CLC flake | −62.4 | 53.4 | 4.1 | 2.9 | 83.5 |
| Ex. 17 | CLC sheet | 875 | CLC flake | 41.0 | 23.6 | 2.3 | 2.8 | 43.9 |
| Ex. 18 | CLC sheet | 963 | CLC flake | 52.1 | −9.9 | 2.5 | 3.8 | 51.4 |
| Ex. 19 | CLC shssc | 1050 | CLC flake | 56.4 | −19.5 | 3.1 | 4.3 | 58.4 |
| Ex. 20 | CLC sheet | 1225 | CLC flake | −52.3 | −0.3 | 2.9 | 4.4 | 55.4 |
| Ex. 21 | CLC sheet | 1401 | CLC flake | −20.8 | 2.3 | 4 | 3.9 | 24.8 |
| Ex. 22 | CLC sheet | 1576 | CLC flake | 29.8 | 4.7 | 2.9 | 5 | 26.9 |

TABLE 5

|  | First layer | Second layer Re(560) (nm) | Third layer | a*1 | b* | a*3 | b*3 | Δ(1-3) |
|---|---|---|---|---|---|---|---|---|
| Comp. Ex. 1 | CLC sheet | 131 | Al flake | 3.45 | 2.1 | 3.9 | 3.8 | 1.8 |
| Comp. Ex. 2 | CLC sheet | 525 | Al flake | 3.75 | 4.8 | 4.2 | 3.2 | 1.7 |
| Comp. Ex. 3 | CLC sheet | 1401 | Al flake | 4.1 | 3.89 | 4.9 | 3 | 1.2 |
| Comp. Ex. 4 | Al sheet | 131 | CLC flake | −1.9 | −3.8 | 3.9 | 2.9 | 8.9 |
| Comp. Ex. 5 | Al sheet | 525 | CLC flake | −2.9 | −3.1 | 3.5 | 3.4 | 9.1 |
| Comp. Ex. 6 | Al sheet | 1401 | CLC flake | −3.8 | −2.8 | 3 | 3.8 | 9.5 |
| Comp. Ex. 7 | Al sheet | 131 | Al flake | −2.9 | −4.6 | 3.8 | 4.7 | 11.5 |
| Comp. Ex. 8 | Al sheet | 525 | Al flake | −3.5 | −3.5 | 2.9 | 3.6 | 9.6 |
| Comp. Ex. 9 | Al sheet | 1401 | Al flake | −1.9 | −3.8 | 3.7 | 3.6 | 9.3 |

From the results described above, the following matters are understood.

The identification media (display media) according to Examples 1 to 22 have a $\Delta_{(1-3)}$ value of 20 or higher and thereby it is possible to determine with the naked eye that there is a difference between the chromaticity observed from the side of the third layer and the chromaticity observed from the side of the first layer. Accordingly, it can be determined without the need for a special viewer that the identification media (display media) according to Examples 1 to 22 are authentic media.

In comparison with the identification media (display media) according to Examples 1 to 22, the identification media (display media) according to Comparative Examples 1 to 3, in which the third layer is a layer containing metal aluminum flakes and having no circularly polarized light separation function; the identification media (display media) according to Comparative Examples 4 to 6, in which the first layer is a semi-transparent aluminum layer having no circularly polarized light separation function; and the identification media (display media) according to Comparative Examples 7 to 9, in which both the third layer and the first layer are layers having no circularly polarized light separation function have a significantly lower $\Delta_{(1-3)}$ value that is less than 20, and it is not possible to determine with the naked eye that there is a difference between the chromaticity observed from the side of the third layer and the chromaticity observed from the side of the first layer. Accordingly, it cannot be determined that the identification media (display media) according to Comparative Examples 1 to 9 are authentic media.

REFERENCE SIGN LIST 10 first layer
20 second layer
30 third layer
100 display medium (identification medium)
400 producing device
410 multilayered film
411 cholesteric resin layer
412 supporting body (PET film)
411A peeled-off piece
420 film feed-out unit
430 peeling unit
434 bar
435 corner portion
436 nozzle
440 film collecting unit
A10 area
A20 area
A30 area

The invention claimed is:

1. A display medium comprising a first layer, a second layer, and a third layer, wherein:
   a part or an entirety of the first layer, a part or an entirety of the second layer, and a part or an entirety of the third layer are stacked in a thickness direction in this order;
   the first layer is a layer that is capable of reflecting circularly polarized light having a rotation direction D1 and allowing to pass therethrough circularly polarized light having a rotation direction D2, which is a direction opposite to the rotation direction D1;
   the second layer is a phase difference layer;
   the third layer is a layer that is capable of reflecting circularly polarized light whose rotation direction is the rotation direction D1 and allowing to pass therethrough circularly polarized light whose rotation direction is the rotation direction D2;
   the first layer is a layer having cholesteric regularity, and the third layer is a layer containing resin flakes that have cholesteric regularity; and
   a value of Re(400)/Re(560) is 1.00 or more, a value of Re(650)/Re(560) is 1.000 or less, and Re(560) is 300 nm or more and 1250 nm or less, wherein Re(400) represents an in-plane retardation Re of the second layer at wavelength 400 nm, Re(560) represents an in-plane retardation Re of the second layer at wavelength 560 nm, and Re(650) represents an in-plane retardation Re of the second layer at wavelength 650 nm.

2. The display medium according to claim 1, wherein the first layer has a reflectance for unpolarized light of 35% or more and 50% or less in a wavelength range of 420 nm or more and 650 nm or less.

3. The display medium according to claim 1, wherein the resin flakes contained in the third layer have a reflectance for unpolarized light of 35% or more and 50% or less in a wavelength range of 420 nm or more and 650 nm or less.

4. A method for determining authenticity comprising:
- a step (1) of confirming that the display medium according to claim 1 is semi-transparent;
- a step (2) of irradiating the display medium with unpolarized light from a side of the third layer, observing from the side of the third layer light reflected by the display medium, and acquiring color information C3 of the third layer;
- a step (3) of irradiating the display medium with unpolarized light from a side of the first layer, observing from the side of the first layer light reflected by the display medium, and acquiring color information C1 of the first layer; and
- a step (4) of comparing the color information C3 with the color information C1 to determine if the color information C3 and the color information C1 are not the same.

5. An article comprising the display medium according to claim 1.

* * * * *